US010387976B2

(12) United States Patent
Kundu et al.

(10) Patent No.: US 10,387,976 B2
(45) Date of Patent: Aug. 20, 2019

(54) FEDERATED SYSTEM FOR CENTRALIZED MANAGEMENT AND DISTRIBUTION OF CONTENT MEDIA

(71) Applicant: Metropolitan Washington Airports Authority, Washington, DC (US)

(72) Inventors: Goutam Kundu, Ellicott City, MD (US); Thomas Peifer, Harpers Ferry, WV (US); Balaji Karuppiah, Leesburg, VA (US)

(73) Assignee: Metropolitan Washington Airports Authority, Washington, DC (US)

( * ) Notice: Subject to any disclaimer, the term of this patent is extended or adjusted under 35 U.S.C. 154(b) by 293 days.

(21) Appl. No.: 15/368,558

(22) Filed: Dec. 2, 2016

(65) Prior Publication Data

US 2017/0169528 A1 Jun. 15, 2017

Related U.S. Application Data

(60) Provisional application No. 62/262,351, filed on Dec. 2, 2015.

(51) Int. Cl.
*H04L 12/26* (2006.01)
*G06Q 50/14* (2012.01)
*H04L 29/06* (2006.01)
*G06F 21/62* (2013.01)
*G06Q 30/02* (2012.01)

(52) U.S. Cl.
CPC ......... *G06Q 50/14* (2013.01); *G06F 21/6254* (2013.01); *G06Q 30/0281* (2013.01); *H04L 65/4076* (2013.01); *H04L 65/605* (2013.01)

(58) Field of Classification Search
CPC .. G06Q 50/14; G06Q 30/0281; H04L 65/605; H04L 65/4076; G06F 21/6254
See application file for complete search history.

(56) References Cited

U.S. PATENT DOCUMENTS

| | | |
|---|---|---|
| 6,912,540 B2 | 6/2005 | Kohut |
| 6,950,037 B1 | 9/2005 | Clavier |
| 8,112,390 B2 | 2/2012 | Gejdos |
| 8,719,868 B2 | 5/2014 | Tsai |

(Continued)

OTHER PUBLICATIONS

Wikipedia, Amazon Web Services, Jul. 18, 2016, pp. 1-9, https://en.wikipedia.org/wiki/Amazon_Web_Services.

(Continued)

*Primary Examiner* — Oanh Duong
(74) *Attorney, Agent, or Firm* — Todd Juneau; Juneau & Mitchell

(57) ABSTRACT

The invention comprises a federated system having a centralized data collection node that receives real-time data feeds from multiple airport systems, a data decoupling module for scrubbing received data, coding scrubbed data, and validating coded output data, and a central control node for monitoring and controlling the system. The invention also includes graphical user interfaces and methods for displaying such information at a central node, or NOC. The invention can also detect output devices and create specific special purpose feeds for each data destination or remote display, as well as systems that allow an airline to remotely access and update the status and settings of a remote travel operations display system via the Internet.

4 Claims, 15 Drawing Sheets

(56) References Cited

U.S. PATENT DOCUMENTS

| | | | |
|---|---|---|---|
| 8,965,600 B2 | 2/2015 | Kolbe | |
| 2005/0131725 A1* | 6/2005 | Sleeper | G06Q 10/06 715/212 |
| 2009/0012896 A1* | 1/2009 | Arnold | G06Q 20/10 705/39 |
| 2013/0117057 A1* | 5/2013 | Van Moltke | G06Q 10/06311 705/7.13 |
| 2013/0191833 A1* | 7/2013 | Kotzur | G06F 1/3268 718/102 |
| 2013/0346887 A1* | 12/2013 | Damis | H04L 51/046 715/758 |
| 2015/0148999 A1* | 5/2015 | Mere | G05D 1/00 701/3 |
| 2015/0278765 A1* | 10/2015 | Dantuluri | G06Q 10/109 705/319 |
| 2016/0029224 A1* | 1/2016 | Edge | G01S 5/0252 455/456.1 |
| 2016/0042316 A1* | 2/2016 | Gates | G06Q 10/08 700/230 |
| 2016/0063869 A1* | 3/2016 | Kathirvel | G08G 5/0043 701/3 |
| 2016/0125741 A1* | 5/2016 | Shorter, Jr. | G08G 5/0034 701/528 |
| 2016/0290817 A1* | 10/2016 | Hoogland | G01C 21/3492 |
| 2017/0070674 A1* | 3/2017 | Thurow | H04N 7/181 |

OTHER PUBLICATIONS

Wikipedia, Application programming interface, Jul. 18, 2016, pp. 1-14, https://en.wikipedia.org/wiki/Application_programming_interface.
Wikipedia, BitTorrent, Jul. 18, 2016, pp. 1-19, https://en.wikipedia.org/wiki/BitTorrent.
Wikipedia, Data integration, Jul. 18, 2016, pp. 1-7, https://en.wikipedia.org/wiki/Data_integration.
Wikipedia, Drupal, Jul. 18, 2016, pp. 1-13, https://en.wikipedia.org/wiki/Drupal.
Wikipedia, Firebase, Jul. 18, 2016, pp. 1-5, https://en.wikipedia.org/wiki/Firebase.
Flightstats Developer Center, FlightStats Flex API Reference Jul. 18, 2016, pp. 1-8, https://developer.flightstats.com/api-docs/.
Heroku Dev Center, How Heroku Works, Jul. 18, 2016, pp. 1-10, https://devcenter.heroku.com/articles/how-heroku-works.
Wikipedia, JSON, Jul. 18, 2016, pp. 1-15, https://en.wikipedia.org/wiki/JSON.
Wikipedia, OpenID, Jul. 18, 2016, pp. 1-12, https://en.wikipedia.org/wiki/OpenID.
Wikipedia, Representational state transfer, Jul. 18, 2016, pp. 1-7, https://en.wikipedia.org/wiki/Representational_state_transfer.
Wikipedia, Soap, Jul. 18, 2016, pp. 1-6, https://en.wikipedia.org/wiki/SOAP.
The VLDB Journal, Daniel J. Abadi, Aurora: a new model and architecture for data stream management, 2003, pp. 1-20.

* cited by examiner

FIGURE 1 – PRIOR ART

| Airline | From | Flight | Arrival | Actual | Status | Baggage |
|---|---|---|---|---|---|---|
| UNITED | ORD | 123 | 09:00 | 09:00 | On time | 3 |
| DELTA | ATL | 456 | 09:10 | 09:08 | Early | 2 |
| SOUTHWEST | BWI | 67 | 09:21 | 09:35 | Delay | -- |
| AMERICAN | IAD | 78 | 09:22 | | Cancel | -- |
| AIRTRAN | DEN | 89 | 09:38 | 09:42 | Late | 6 |
| ALASKA | MSP | 910 | 09:39 | 09:39 | On time | 7 |
| FRONTIER | DEN | 1011 | 09:41 | 09:42 | Late | -- |
| AMERICAN EAGLE | IAH | 1112 | 09:47 | 09:47 | On time | 1 |
| SUN COUNTRY | MSP | 121 | 09:52 | 09:53 | Late | 5 |

FEDERATED SYSTEM FOR CENTRALIZED MANAGEMENT AND DISTRIBUTION OF CONTENT MEDIA

FIELD OF THE INVENTION

The present invention relates generally to a system and method for distribution and delivery of media content and other data to airport or campus users, employees, and vendors, and more particularly to an integrated distribution system that collects data from multiple feeder sources into a single database, scrubs, re-purposes, and validates the data to create one or more filtered special-purpose data feed distributions that is published to user display devices.

BACKGROUND OF THE INVENTION

A modern airport will have multiple separate systems for displaying flight information, check-in, baggage information, public safety, TSA, weather, gate information, vendor advertising, transportation, control tower and tarmac operations information. Each of these system generates their own data feed, in their own format, stored and retrieved from their own databases, updated on their own schedule, and displayed to their specific user population via dedicated displays.

It is currently not possible within existing airport systems to, from a single central control station, change the feed at a specific display, e.g. flight departures, located at a specific location such as the main terminal, to a different feed, for example public safety evacuation instructions.

It is also not currently possible at existing modern airports for a passenger to subscribe to an air travel application on his or her mobile device that provides passenger specific information, such as providing a geo-tag for his or her vehicle in order to remember a parking spot, providing the walking travel time from the parking spot to reach the gate associated with their flight, providing updated boarding times and departure times, providing information on the trend of the queue at the TSA checkpoint associated with their gate, encouraging the passenger to decide on a post-TSA checkpoint coffee versus a pre-TSA checkpoint coffee by offering a coupon (intra-airport passenger management), providing flight information, weather information, providing in-flight meal and entertainment information and carry-on options, using smartphone near-field communications to provide airport vendor coupons, and using their smartphone IP address to send accurate, real-time reminders or alerts.

Accordingly, there is strong demand for accurate, timely content by users of airports and other campus-type facilities. There is currently no available single unified interface to achieve all or most of these functions. The prior art does not teach a centrally located computer that distributes a stream of constantly updated data to a plurality of data distribution nodes for periodic download as taught by this invention.

There is a long-felt need for airport and campus operators to be able to receive data feeds form multiple sources, scrub, code, and validate the data, and then re-distribute selected or filter information to travel operations displays and user equipment.

BRIEF SUMMARY OF THE INVENTION

In a preferred embodiment, the invention comprises a combined airport feeds user interface, comprising:
a data feeds region configured to display links to real-time airport data feeds selected from the group consisting of an airline feed, a baggage feed, a terminal feed, a public safety feed, a passenger feed, a weather fed a gate feed, a vendor feed, a transportation feed, an air traffic control feed, and a media feed;
a system management region configured to display system management tools for a travel operations display system for centralized management and distribution of airport content media, wherein the travel operations display system comprises (i) a centralized data collection node that receives the real-time airport data feeds, (ii) a data decoupling module for scrubbing the received data of the real-time airport feeds, coding the scrubbed data, and validating the coded data, and (iii) a central control node for monitoring and controlling the travel operations display system; and
at least one additional region configured to display information relating to the at least one additional region, wherein the at least one additional region selected from a manage relational database region, a manage remote display region, a manage customer/passenger mobile devices region, an emergency management region, an archive region, a manage beacon network region, a generate reports region, a communication region, an alert region, and an system parameters region.

In another preferred embodiment, the invention comprises a method of providing information about airport operations, comprising:
providing a combined airport feeds user interface comprising a data feeds region, a system management region, and at least one additional region;
displaying airport data feed information in said data feeds region, wherein said airport data feed information is generated by a travel operations display system that comprises (i) a centralized data collection node that receives the real-time airport data feeds, (ii) a data decoupling module for scrubbing the received data of the real-time airport feeds, coding the scrubbed data, and validating the coded data, and (iii) a central control node for monitoring and controlling the travel operations display system;
displaying system management information in said system management region, wherein said system management information is generated by the travel operations display system; and
displaying additional information in said at least one additional region, wherein said additional information is selected from relational database information, remote display information, customer/passenger mobile devices information, emergency management information, archive information, beacon network information, generating reports information, communication information, alert information, and system parameter information.

In yet another preferred embodiment, the invention comprises a travel operations display system, having:
a centralized data collection node that receives real-time or near real-time data feeds from multiple combined airport and external systems;
a data decoupling module for scrubbing received data, coding scrubbed data, and validating coded output data; and
a central control node for monitoring and controlling the real-time data feeds, database management, data decoupling and output selection, device detection feedback, output data feed distribution to a display device, and the updating of output data feeds for repurposing a display device.

In certain aspects, the travel operations display system also includes an output selection module for creating a plurality of filtered special purpose output data feeds, a device detection feedback module for modifying and updating the output selection module, an output distribution module for distributing each filtered special purpose output data feeds to special purpose output data display device; and a display reconfiguration module for updating each filtered special purpose output data feed and for re-purposing the filtered special purpose output data feed to include a second selection of real-time data feeds different from the original selection of real-time data feeds.

In a preferred embodiment, the real-time data feeds comprise an airline data feed, a baggage control data feed, a TSA data feed, a weather data feed, a transportation data feed, a public safety data feed, a gate information data feed, and an airport vendor data feed.

In another preferred embodiment, the invention comprises a method of providing media content to a plurality of displays in an airport, comprising:
  receiving real-time data feeds from multiple airport systems into a centralized data collection node;
  scrubbing received data, coding scrubbed data, and validating coded output data, using a data decoupling module;
  creating a plurality of filtered special purpose output data feeds, using an output selection module;
  modifying and updating the output selection module, using a device detection feedback module;
  distributing each filtered special purpose output data feeds to special purpose output data display device, using an output distribution module;
  updating each filtered special purpose output data feed and re-purposing the filtered special purpose output data feed to include a second selection of real-time data feeds different from the original selection of real-time data feeds, using a display reconfiguration module; and
  monitoring and controlling the real-time data feeds, database management, data decoupling and output selection, device detection feedback, output data feed distribution to a display device, and the updating of output data feeds for repurposing the plurality of displays in an airport, using a central control node.

In another preferred embodiment, the invention comprises a method of providing media content to a smartphone of a passenger in an airport, comprising:
  receiving real-time data feeds from multiple airport systems into a centralized data collection node;
  scrubbing received data, coding scrubbed data, and validating coded output data, using a data decoupling module;
  creating a plurality of filtered special purpose output data feeds, using an output selection module;
  modifying and updating the output selection module, using a device detection feedback module;
  distributing each filtered special purpose output data feeds to the smartphone, using an output distribution module;
  updating each filtered special purpose output data feed and re-purposing the filtered special purpose output data feed to include a second selection of real-time data feeds different from the original selection of real-time data feeds, using a display reconfiguration module; and
  monitoring and controlling the real-time data feeds, database management, data decoupling and output selection, device detection feedback, output data feed distribution to the smartphone, and the updating of output data feeds for repurposing the smartphone, using a central control node.

In another preferred embodiment, the invention comprises a system for providing a system that allows an airline to remotely access the status and settings of a remote travel operations display system via the Internet, the system comprising:
  a web server connected to the Internet, the web server is programmed to access the remote travel operations display system and has a data storage device, a connection to the Internet to communicate with the airline, and a messaging gateway coupled to a network to communicate with the remote travel operations display system, at least one remote access module is connected to the remote travel operations display system, the remote access module has a digital interface coupled to the remote travel operations display system and a communications module to communicate with the web server via the network, and the messaging gateway, and an internet device is connected to the internet to allow the airline to communicate with the web server, wherein the airline can remotely access and control the remote travel operations display system via the web server.

In another preferred embodiment, the invention comprises a method of providing a system that allows an airline to remotely access the status and settings of a remote travel operations display system via the Internet, the method comprising the steps of:
  providing a web server connected to the Internet, wherein the web server is programmed to access the remote travel operations display system, wherein the web server has a data storage device, a connection to the Internet to communicate with the airline, and a messaging gateway coupled to a network to communicate with the remote travel operations display system;
  providing at least one remote access module that is connected to the remote travel operations display system, the remote access module having a digital interface coupled to the remote travel operations display system and a communications module to communicate with the web server via the network, and the messaging gateway; and
  providing an internet device is connected to the internet to allow the airline to communicate with the web server, wherein the airline can remotely access and control the remote travel operations display system via the web server.

In another preferred embodiment, the invention comprises a method of remotely updating a travel operations display system via the Internet, comprising the steps:
  accessing the travel operations display system at a remote airport location, via the Internet;
  providing updated airline information to the remote travel operations display system;
  wherein the updated airline information is received into a centralized data collection node;
  wherein a data decoupling module scrubs the received updated airline information, codes the scrubbed data, and validates the coded output data;
  wherein an output selection module creates a special purpose output data feed,
  wherein a device detection feedback module modifies and updates the output selection module, wherein an output distribution module distributes the special purpose output data to a special purpose output data display device;

wherein a central control node monitors and controls the updated airline information, the database management, the data decoupling and output selection, the device detection feedback, and the output data feed distribution to a display device.

BRIEF DESCRIPTION OF THE FIGURES

FIG. 1 is a graphic showing typical flight information as displayed at a modern airport.

DETAILED DESCRIPTION OF THE INVENTION

Figure 2:
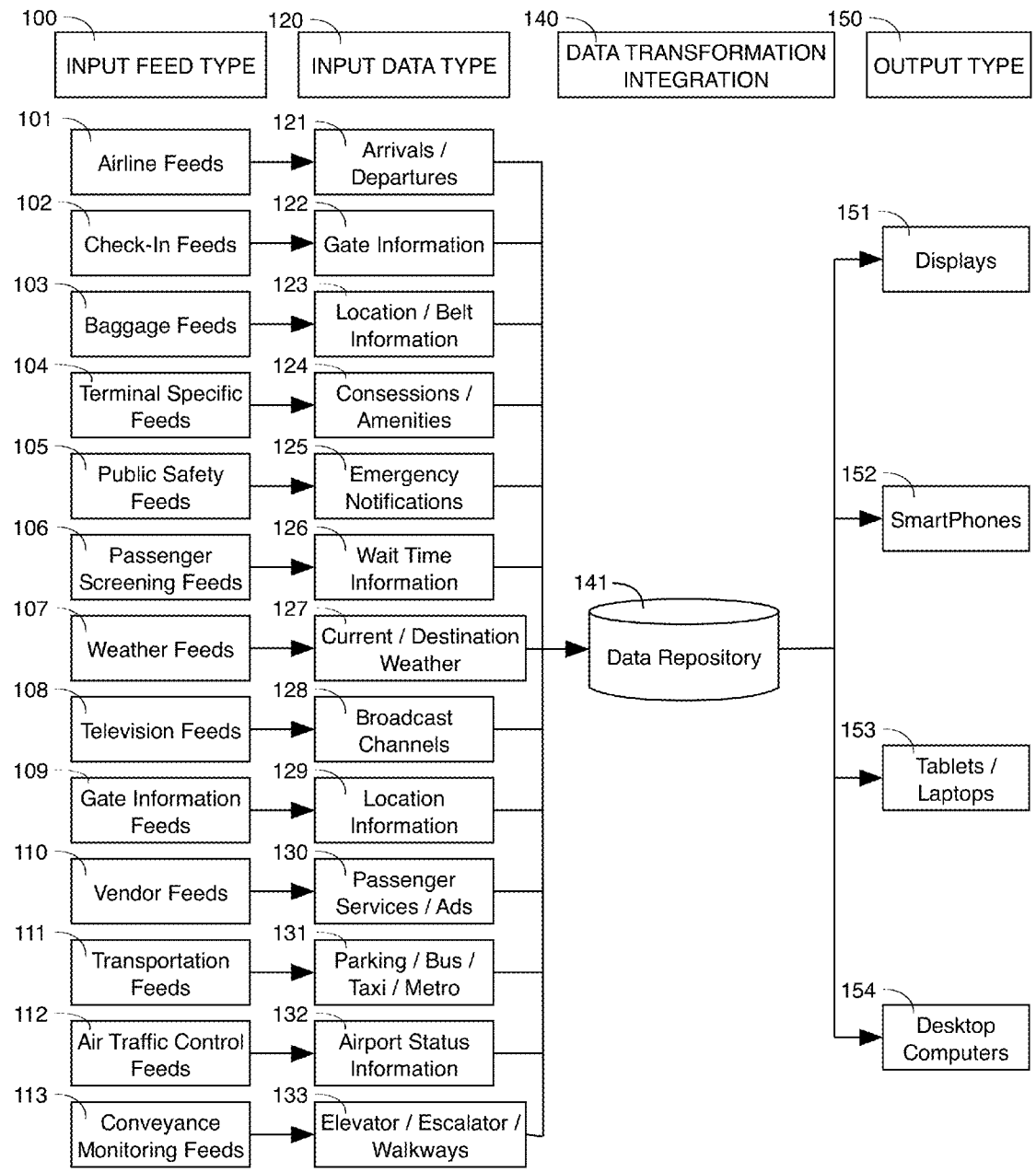
FIG. 2 is a graphic flowchart illustrating real-time data feeds from multiple airport systems logically connected to a central data collection node equipped with database storage and maintenance tools, and with a data decoupling module for processing and converting the real-time data feeds and distributing the filtered device-modified special purpose output data feed to displays and user equipment.

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

It will be appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a computer readable storage medium having non-transitory computer usable program code embodied in the medium. Any suitable computer readable medium may be utilized including hard disks, CD-ROMs, optical storage devices, flash memories, or magnetic storage devices.

Computer program code or software programs that are operated upon or for carrying out rations according to the teachings of the invention may be written in a high level programming language such as C, C++, JAVA®, Smalltalk, JavaScript®, Visual Basic®, TSQL, Python, Ruby, Perl, use of .NET™ Framework, Visual Studio® or in various other programming languages. Software programs may also be written directly in a native assembler language for a target processor. A native assembler program uses instruction mnemonic representations of machine level binary instructions. Program code or computer readable medium as used herein refers to code whose format is understandable by a processor. Software embodiments of the disclosure do not depend upon their implementation with a particular programming language.

Overview—Travel Operations Display System

In a preferred embodiment, the invention comprises a system for centralized management and distribution of content media, also referred to herein as a travel operations display system, having a centralized data collection node that receives real-time data feeds from multiple airport systems, a data decoupling module for scrubbing received data, coding scrubbed data, and validating coded output data, an output selection module for creating a plurality of filtered special purpose output data feeds, and a central control node for monitoring and controlling the real-time data feeds, database management, data decoupling and output selection, device detection feedback, output data feed distribution to a display device, and the updating of output data feeds for repurposing a display device.

The system may also include a device detection feedback module for modifying and updating the output selection module, an output distribution module for distributing each filtered special purpose output data feeds to special purpose output data display device, and a display reconfiguration module for updating each filtered special purpose output data feed and for re-purposing the filtered special purpose output data feed to include a second selection of real-time data feeds different from the original selection of real-time data feeds.

Overview—Airline Remote Access System

In another preferred embodiment, there is provided a system that allows an airline to remotely access the status and settings of a remote travel operations display system via the Internet, the system comprising, a web server connected to the Internet, the web server is programmed to access the remote travel operations display system and has a data storage device, a connection to the Internet to communicate with the airline, and a messaging gateway coupled to a network to communicate with the remote travel operations display system, at least one remote access module is connected to the remote travel operations display system, the remote access module has a digital interface coupled to the remote travel operations display system and a communications module to communicate with the web server via the network, and the messaging gateway, and an internet device is connected to the internet to allow the airline to communicate with the web server, wherein the airline can remotely access and control the remote travel operations display system via the web server.

Data Processing

Aggregating data from multiple data feed sources requires the data from each data feed is processed. Processing as defined herein includes the validation, sorting, summarization, aggregation, analysis, reporting, and classification. Validation as used herein is the process of ensuring that the real-time data feeds and the special purpose output data feeds are without errors and are accurate. Sorting as defined herein arranges real-time data feeds into sets and sequences. Summarization as defined herein distills real-time data feeds into pre-selected main categories, and can use tagging as a method to modify real-time data feeds and create the special purpose output data feeds. Aggregation as defined herein is the combining of the tagged, distilled, sorted, and validated data into new groups. Analysis as defined herein is the combined process of collecting, organizing, analyzing, interpreting, and presenting the data. Reporting as defined herein is the creation of a summary of the processed data, the special purpose output data feeds. Classification as defined herein is the separating of the real-time data feeds and the special purpose output data feeds into various categories.

Types of Real-Time Data Feeds

In preferred aspects, the real-time data feeds include an airline data feed, a baggage control data feed, a TSA data feed, a weather data feed, a ground transportation data feed, a public safety data feed, a gate information data feed, and an airport vendor data feed.

Airline Data Feed is received directly from airlines but may also be received from flight data feed vendors. Airline and flight data includes flight number, destination airport, departure airport, flight arrival and departure time, and flight status. Airline data feed may also include aircraft position (lat/long), altitude, ground speed, heading, aircraft ID and registration, and timestamp.

Baggage Control Feed is received from the Baggage Operation at the airport and includes baggage claim data, bag identification serial number or RFID code, TSA conveyor belt checking system data, number of bags on a flight, baggage transfer data—direct to plane or standard sort, lost baggage data, connecting flight data, departure timer, departure airport ID, destination ID, special handling data, missing bag alert data, and so forth. Improvements in on-time flight performance at airlines is often driven by baggage reliability, and vice versa. If flights arrive on-time, handlers have a better chance of connecting bags to the next flight. Accordingly, airports have a vested interest in moving bags faster from the curb to the airplane baggage compartment, and then to the baggage claim area. In 2013, airlines mishandled 21.8 million bags, or 6.96 per 1,000 passengers, according to SITA. Repatriating delayed or lost luggage to passengers cost an average of $100 per bag. In 2013, the rate of mishandled baggage in the U.S. as tracked by the Transportation Department was 3.22 for every 1,000 passengers.

TSA Data feed includes baggage scanning data, passenger scanning data, personnel data for each flight, security level and threat assessment data, name and biometric information of restricted passengers, flight-specific data, and event-driven situational data.

Weather Data Feed includes destination and departure weather data, weather data for connecting flights and weather data for bottle-neck airports.

Ground Transportation Feed includes public transportation data, parking deck data, private for-hire transportation data, airport traffic accident data, and local traffic data.

Public Safety Feed includes fire department data, medical emergency data, police department data, and any feeds involving natural disaster, and other dangerous or emergency situations.

Gate Information Feed includes flight status data, flight number, arrival and departure data, gate change data, passenger seating data, upgrade data, standby data, flight cancellation data, passenger missed flight data, carry-on baggage data, and passenger assistance data.

Airport Vendor Feed includes vendor location, vendor name, type of vendor, hours of operation, vendor marketing request data, and so forth.

Tower and tarmac feed includes flight number, runway data, gate status data, maintenance data, fuel data, catering transportation data, baggage transfer data, emergency data, and so forth.

Feed Formats & Transmission

As will be appreciated by a person of ordinary skill in the art, the travel operations display system also functions as a clearinghouse for media content received from multiple providers as digital packets of streaming content, pre-recorded content, or static content. In preferred aspects, the content is MPEG encoded depending on the type of content. Physical delivery of the content to displays and user equipment is contemplated to be via wired and wireless technologies, including but not limited to Ethernet, coaxial cable, twisted pair copper cabling, POTS, WiFi, Ultra-Wide Band, 3G, 4G, LTE, LTE Advanced, Bluetooth, Satellite bands, and NFC. Those of ordinary skill in the art will appreciate that various communication protocols for data transfer may be used such as TCP/IP (Transmission Control Protocol/Internet Protocol) protocols (TCP, FTP and UDP). The specific protocols chosen will depend upon the design requirements for a given system. Encryption and decryption techniques are contemplated for protecting the distribution and access of the media and data streams.

Database

As defined herein the collection of data in the database is managed by a database management system to allow the definition, creation, querying, updating, and administration of the database. Well known systems that support relational and post-relational models include MySQL, PostgreSQL, MS-SQL Server, Oracle, Sybase, IBM DB2, and XML db systems such as NoSQL, NewSQL.

Existing DBMSs provide various functions for managing a database and its data which can be classified into four main functions:

Data definition—Creation, modification and removal of definitions that define the organization of the data.

Update—Insertion, modification, and deletion of the actual data.

Retrieval—Providing information in a form directly usable or for further processing by other applications. The retrieved data may be made available in a form basically the same as it is stored in the database or in a new form obtained by altering or combining existing data from the database.

Administration—Registering and monitoring users, enforcing data security, monitoring performance, maintaining data integrity, dealing with concurrency control, and recovering information that has been corrupted by some event such as an unexpected system failure.

Application Programming Interfaces (APIs)

In a preferred aspect, the invention uses an application programming interface (API) architecture to define the programmable interfaces through which the travel operations display system interacts with applications that use its assets. This allows the programmable interfaces to provide different sets of services to different application serving different types of consumers. The API disclosed herein uses custom library code in order to provide reusable modules that are determined based upon the user interface that is accessing the library. These precoded modules allow application-specific access to the database that contains the real-time data feeds from multiple airport systems that has been converted into the device-modified special purpose output data feed for distribution to airport displays and user equipment.

In a preferred aspect, the API architecture includes an end user component that interacts with a client applications component where the client applications component connects to and leverages a core API infrastructure. In one preferred embodiment of the invention, the core API infrastructure includes a security layer that interfaces with a caching layer, a representation layer connected to the caching layer, an orchestration layer between the representation layer and the API implementation layer, and a backend layer interfacing with the API implementation layer.

Digital Signage

As defined herein, digital signage refers to the use of small and large computer screens to display still and moving media having different information scheduled at various times and capable of being updated remotely. Examples of computer screens include projectors, LCD and LED monitors, touch screens, touch screen overlays, multi-touch screens, kiosks, plasma screens, window films, and equivalent technology. The output feed received from the travel operations display system can be presented on the computer screens using standard presentation graphics software. Examples of presentation graphics software includes Microsoft PowerPoint, OpenOffice and LibreOffice presentation software, MS Media player, built-in media players such as Optoma's SignShow, JVC's TV-TOLLS, and Samsung's MagicInfo, and media player software and equipment from LG, Mitsubishi, NEC, Panasonic, Philips, Sharp, Sony, and ViewSonic, and interactive media players such a CAYIN technology. It is also contemplated as within the scope of the invention to use multi-mount screens using two or more adjacent screens to create a display.

Airline Remote Access System Detail

A remote access and control system enabling an airline to remotely access a remote travel operations display system. Access system provides the airline with one or more ways to connect to and to communicate with web server running a computer program to send commands to and receive information from remote travel operations display system through a remote access module. Each remote access module can control one or more remote travel operations display system at each location. The airline can register, setup notifications, and or access and control at least one remote travel operations display system via access system. Airline specific login and configuration information, including remote travel operations display system locations, and detailed instruction information about each system, including optional notifications, can be stored as airline data. The airline data can be stored on Web Server, typically via data storage element as an airline profile. The airline profile can be stored in a variety of data structures such as in one or more relational databases stored on data storage element, or some other compatible computer storage media accessible by web server. Once registered, an airline can remotely access remote travel operations display system in multiple locations by connecting to web server. The airline can connect to web server by one of several different connect methods, such as via the Internet or through a telephone system.

Connection to web server through the Internet can be accomplished in several ways. an airline can connect to web server using a personal computer ("PC"), including an IBM compatible machine, such as those using an INTEL, AMD, or similar processor as well as by computers running another operating system ("OS"), such as an APPLE compatible OS. Any suitable PC or terminal can also connect to the internet by a wireless network such as an IEEE 802.11 type WiFi or 802.15/16 WiMax connection or a hardwired local area connection ("LAN"). Other suitable connections can be made by the airline using an internet enabled cell phone with web browser connecting to the Internet through a cellular network or a PDA with cellular, wireless, or wired access to the Internet.

An airline can also connect to web server from the telephone network. The airline can use a cell phone to connect to telephone network via wireless cellular connection.

Web server can communicate with a plurality of remote travel operations display systems at one or more locations via messaging gateway. Messaging gateway can communicate with wireless system via the internet or by a direct connection such as by Ethernet. Wireless system can then connect with a communications module associated with a particular remote travel operations display system.

Registration: Before using system, an airline typically registers for the remote access service. An airline inputs information into the system during registration to build an airline profile. The airline profile can include a username, access code, location information, system information, and information on the various remote travel operations display systems. Where notifications are used, the profile can further include notifications tables.

Interaction via the Web: Once registered, the airline can login from any web browser, anywhere there is access to the World Wide Web ("web"), typically through the Internet. First, the consumer does a login to web server 108. On successful login to web server 108, in step B, the consumer gains access to the comfort systems at a remote location. In step C, the consumer can request the current status and settings for any comfort system at the remote location. The status and settings are then returned for the equipment at that location and those settings are displayed on one or more web pages for consumer viewing in step D. In step E, the consumer can optionally adjust the settings. In step F, the consumer logs out or otherwise disconnects from web server 108.

Notifications: It can be desirable for remote travel operations display systems to notify concerned or responsible parties of system status, system events, alarms, trips, and various other failures. These notifications can be routine, as in a periodic status update of readings and settings. A routine notification is typically something that does not require immediate attention or action. Or, a notification can be urgent. An urgent notification generally requires immediate attention.

Remote access module constantly monitors the state of the airline's remote travel operations display system. A routine or urgent notification can be detected by remote access module. Remote access module can send the notification to web server using communications module, a 2-way paging module in one embodiment, communicating via communications network to messaging gateway. Messaging gateway sends the notification to web server. Web server determines if the notification is routine or urgent and then can consult a notification table to determine which access methods should be invoked to deliver the notification to one or more designation recipients including, but not limited to, the airline, or one or more alternate contacts. Web server can use an email protocol to send a notification by an email service, to a text pager via a text pager network, or to directly send an email to an email address via a network such as the Internet.

Beacons/Sensors

The NOC, remote displays, remote computers and remote beacons for communication with passenger mobile devices may be implemented in a single processor or multiple processors. Beacons are located through a facility to maintain network contact with mobile devices. Multiple processors can be distributed or centrally located. Multiple processors can communicate wirelessly, via hard wire, or any combination thereof.

Beacon units include an antenna, electronics, e.g. LNA, oscillator/bandwidth modulator, optional signal processing, a processor, a memory, and an input/output. The processor unit, memory, and input/output are coupled together to allow communication among each other. The input/output is capable of receiving beacon registration information from the NOC, beacon data, beacon pull requests, system configuration commands, database queries and database record updates. The input/output is also capable of sending reports, beacon data and database record data to the NOC.

Figures

Referring now to the Figures, FIG. 1 is a graphic showing typical flight information as displayed at a modern airport. FIG. 1 shows how current displays are static, generally non-reprogrammable, and are limited to the data feeds defined at deployment.

FIG. 2 is a graphic flowchart illustrating real-time data feeds from multiple airport systems logically connected to a central data collection node equipped with database storage and maintenance tools, and with a data decoupling module for processing and converting the real-time data feeds and distributing the filtered device-modified special purpose output data feed to displays and user equipment. FIG. 2 shows how the disparate data feeds have been aggregated, and converted to device-based feeds.

Input feed types 100 may include one or more external data streams or feeds. In one embodiment, the feeds include airline feed data 101, check-in feed data 102, baggage feed data 103, terminal specific feed data 104, public safety feed data 105, passenger screening feed data 106, weather feed data 107, television feed data 108, gate information feed data 109, vendor feed data 110, transportation feed data 111, air traffic control feed data 112, conveyance monitoring feed data 113, and other related data.

The airline feed data 101 received from an airline includes arrival and departure data 121 directly from the airline and formatted as received from the airline. This external airline feed data is structured and transmitted in a secured and/or proprietary format appropriate for the secure and timely delivery of airline data to an airport, and as such, needs to be mapped (M) and extracted (E), re-coded (C), and validated (V) before the data is transmitted as MECV airline data to the Data Repository 141.

The check-in feed data 102 received from the airline check-in desk includes gate information 122 from the airline or a proxy. This external check-in feed data is structured and transmitted in a secured and/or proprietary format appropriate for the secure and timely delivery of check-in data to airport systems, airlines, and related parties, and as such, needs to be mapped, extracted, re-coded, and validated before the data is transmitted as MECV check-in data to the Data Repository 141.

The baggage feed data 103 received from the airport baggage system includes baggage location and belt information 123 from the airport baggage system or a proxy. This baggage data may include both airport-generated data, airline information, law enforcement information relating to TSA lists, other federal agency information such as DEA (drugs), FDA (foodstuffs, pharmaceuticals, etc.), Treasury (currency), ATF (firearms, etc.), and may also include similar parallel State government or law enforcement data. This external baggage feed data is structured and transmitted in a secured and/or proprietary format appropriate for the secure and timely delivery of baggage data to airport systems, airlines, and related parties, and as such, needs to be mapped, extracted, re-coded, and validated before the data is transmitted as MECV baggage data to the Data Repository 141.

The terminal-specific feed data 104 received from the airport terminal system includes concessions and amenities information 124 from the airport terminal system or a proxy. This external terminal-specific feed data is structured and transmitted in a secured and/or proprietary format appropriate for the secure and timely delivery of concessions and amenities information to airport systems, airlines, and related parties, and as such, needs to be mapped, extracted, re-coded, and validated before the data is transmitted as MECV terminal-specific data to the Data Repository 141.

The public safety feed data 105 received from the airport public safety system includes real-time emergency notification information 125 from the airport public safety system, first responder system, or a proxy. This external public safety feed data is structured and transmitted in a secured and/or proprietary format appropriate for the secure and timely delivery of public safety data to airport systems, airlines, and related parties, and as such, needs to be mapped, extracted, re-coded, and validated before the data is transmitted as MECV public safety data to the Data Repository 141.

The passenger screening feed data 106 received from the airport passenger screening system includes wait time information 126 from the airport passenger screening system or a proxy. This passenger screening data includes external passenger screening data such as TSA no-fly list data, federal or State judicial information for wanted persons or fugitives, federal or State law-enforcement data relating to child-safety alerts, immigration, customs, taxation, and so forth. This external passenger screening feed data is structured and transmitted in a secured and/or proprietary format appropriate for the secure and timely delivery of passenger screening data to airport systems, airlines, and related parties, and as such, needs to be mapped, extracted, re-coded, and validated before the data is transmitted as MECV passenger screening data to the Data Repository 141.

The weather feed data 107 received from the airport weather system includes current destination weather information 127 from the airport weather system or a proxy. This external weather feed data is structured and transmitted in a secured and/or proprietary format appropriate for the secure and timely delivery of weather data to airport systems, airlines, and related parties, and as such, needs to be s mapped, extracted, re-coded, and validated before the data is transmitted as MECV weather data to the Data Repository 141.

The television feed data 108 received from the airport television control system includes broadcast channels and information 128 from the airport television control system or a proxy. This external television feed data is structured and transmitted in a secured and/or proprietary format appropriate for the secure and timely delivery of television data to airport systems, airlines, and related parties, and as such, needs to be s mapped, extracted, re-coded, and validated before the data is transmitted as MECV television data to the Data Repository 141.

The gate information feed data 109 received from the airport gate information system includes gate location information 129 from the airport gate information system or a proxy. This gate information data includes airline/airport gate assignments, gate changes, gate maintenance, jetway data, air travel delay data, passenger secondary verification and screening data, excess baggage data, carry-on baggage data, disabled passenger data (wheelchair, chaperone, carting), and special need passenger data (unaccompanied minor). This external gate information feed data is structured and transmitted in a secured and/or proprietary format appropriate for the secure and timely delivery of gate information data to airport systems, airlines, and related parties, and as such, needs to be mapped, extracted, re-coded, and validated before the data is transmitted as MECV gate data to the Data Repository 141.

The vendor feed data 110 received from the airport vendor system includes passenger services and advertising information 130 from the airport vendor system or a proxy. This external vendor feed data is structured and transmitted in a secured and/or proprietary format appropriate for the secure and timely delivery of vendor data to airport systems, airlines, and related parties, and as such, needs to be s mapped, extracted, re-coded, and validated before the data is transmitted as MECV vendor data to the Data Repository 140.

The transportation feed data 111 received from the airport transportation system includes parking, bus, taxi, and subway/rail information 131 from the airport transportation system or a proxy. This external transportation feed data is structured and transmitted in a secured and/or proprietary format appropriate for the secure and timely delivery of transportation data to airport systems, airlines, and related parties, and as such, needs to be mapped, extracted, re-coded, and validated before the data is transmitted as MECV transportation data to the Data Repository 141.

The air traffic control feed data 112 received from the airport air traffic control system includes airport status information 132 from the air traffic control system or a proxy. This air traffic control data may include airborne air traffic data, ground/runway data, ground crew and ground equipment data, jetway data, aircraft re-fuelling data, aircraft re-supply data, weather data, entire air travel system data, and so forth. This external air traffic feed data is structured and transmitted in a secured and/or proprietary format appropriate for the secure and timely delivery of baggage data to airport systems, airlines, and related parties, and as such, needs to be mapped, extracted, re-coded, and validated before the data is transmitted as MECV air traffic control data to the Data Repository 141.

The conveyance monitoring feed 113 received from the airport passenger conveyance system includes elevator, escalator, jetway, and walkway information 133 from the airport conveyance system or a proxy. This external conveyance monitoring feed data is structured and transmitted in a secured and/or proprietary format appropriate for the secure and timely delivery of baggage data to airport systems, airlines, and related parties, and as such, needs to be mapped, extracted, re-coded, and validated before the data is transmitted as MECV conveyance data to the Data Repository 141.

The data repository 141 in FIG. 2 provides the downstream output 150 data that is delivered to the downstream output devices. These devices include displays 151, Smart Phones 152, Tablets and Laptops 153, and desktop computers 154. Using a handshake protocol, when a downstream output device connects to the system, the type of device is queried, and the result is saved at the data repository level 140/141 to a user's profile. The device type is assigned to the user profile during that access session and the MECV data drawn from the data repository 141 is filtered to provide the user with the data appropriate to their use/request. Repository Data Filters include filtering according to a user access privilege/security level filter, a user type-of-data request filter, data timeliness/priority filter, and so forth.

Where a device is, for example, an airport video display device 151, the control center/node can assign a specific real-time selection data to the pushed out to the display. Beyond displaying departure times or baggage pickup areas, remote displays connected to the data repository of the present invention become Smart Remote Displays (SRDs) that are automatically updated according to the passengers/users that are located near the display. By using a unified database system with mapped, extracted, coded, and validated data, an SRD will be modified depending on which passengers are arriving near that display device, and which ones are departing near that display device. This level of customization and geolocation of users provides real-time updating of gate information, real-time baggage advice, real-time vendor and concession marketing and advertising, real-time safety or detour information, real-time weather advice, real-time transportation coordination, and real-time airport conveyance allocation.

In a specific example, a passenger's Smart Phone is registered to the arriving airport system as the passenger deplanes and walks down the jetway. The passenger may have opted for a setting in their Smart Phone application that sends an automated text to family members notifying of their arrival. The airport system will register the arrival of the passenger and notify any connecting flights of their arrival by saving an update to the data repository and sending reports to airline and gate personnel. Internal airport conveyancing, e.g. escalator, wheelchair, or electric shuttle cart, is allocated to optimize the delivery of the passenger from point A to point B. Transportation is notified of the update and receives a real-time action-item report. Vendors concessions, and amenities tools can tailor food, convenience, or shopping options along the passenger's airport route. The passenger's Smart Phone app will generate a navigation screen to welcome the user, and provide local information. Using passenger specific data combined with airport specific data, the travel operations display system will generate and transmit for display a graphical wayfinding navigation aid to assist the passenger with this aspect of their journey. This includes providing information about a connecting flight, providing direction to the coffee shop nearest their gate, providing direction to the nearest toilet, providing directions to the nearest toy store or gift shop, providing directions to the nearest private lounge or massage chair stand, providing information regarding a limousine or taxi, or providing directions for exiting the airport with baggage pickup and transportation pre-arranged.

Additionally, to optimize airport revenue, targeted advertising can be pushed out to the Smart Remote Displays, to the specific customers that an advertising entity has identified as being in their target profile or market. The added benefit of higher airport throughput, combined with less wasted blanket advertising, provides an efficiency not available before the present invention.

Figure 3:
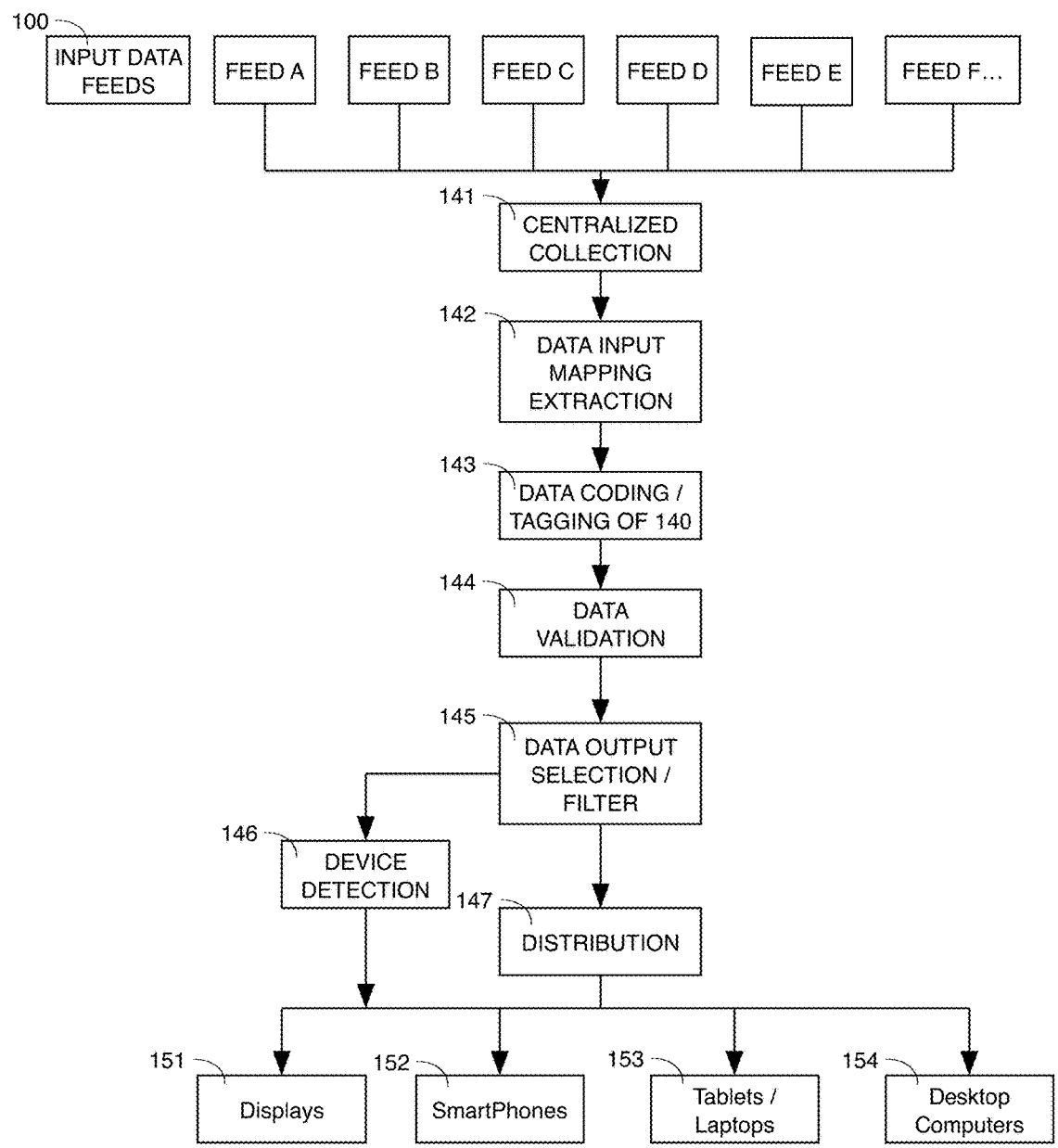
FIG. 3 is a graphic flowchart showing process flow for real-time data feeds from multiple airport systems logically connected to a central data collection node equipped with database storage and maintenance tools, and with a data decoupling module for processing and converting the real-time data feeds and distributing the filtered device-modified special purpose output data feed to displays and user equipment.

FIG. 3 is a graphic flowchart showing process flow for real-time data feeds from multiple airport systems logically connected to a central data collection node equipped with database storage and maintenance tools, and with a data decoupling module for processing and converting the real-time data feeds and distributing the filtered device-modified special purpose output data feed to displays and user equipment.

Input feeds 100 are shown in this process being directed (input) to a centralized collection 141, e.g. data repository. The next step shows how the input data scrubbing process 142, is followed by a data coding/tagging step, and then by a data validation 143 step, to form the mapping, extraction, coding, and validation (MECV) subprocess. After the MECV subprocessing of the external data, unified and re-purposed MECV data is then selected and filtered using an intermediary device detection and handshake protocol to determine the appropriate data to output to each connected device, e.g. filtering by user access privilege/security level filter, a user type-of-data request filter, data timeliness/priority filter, and so forth, to display 151, smartphone 152, tablet/laptop 153 and/or desktop computer 154.

Figure 4:
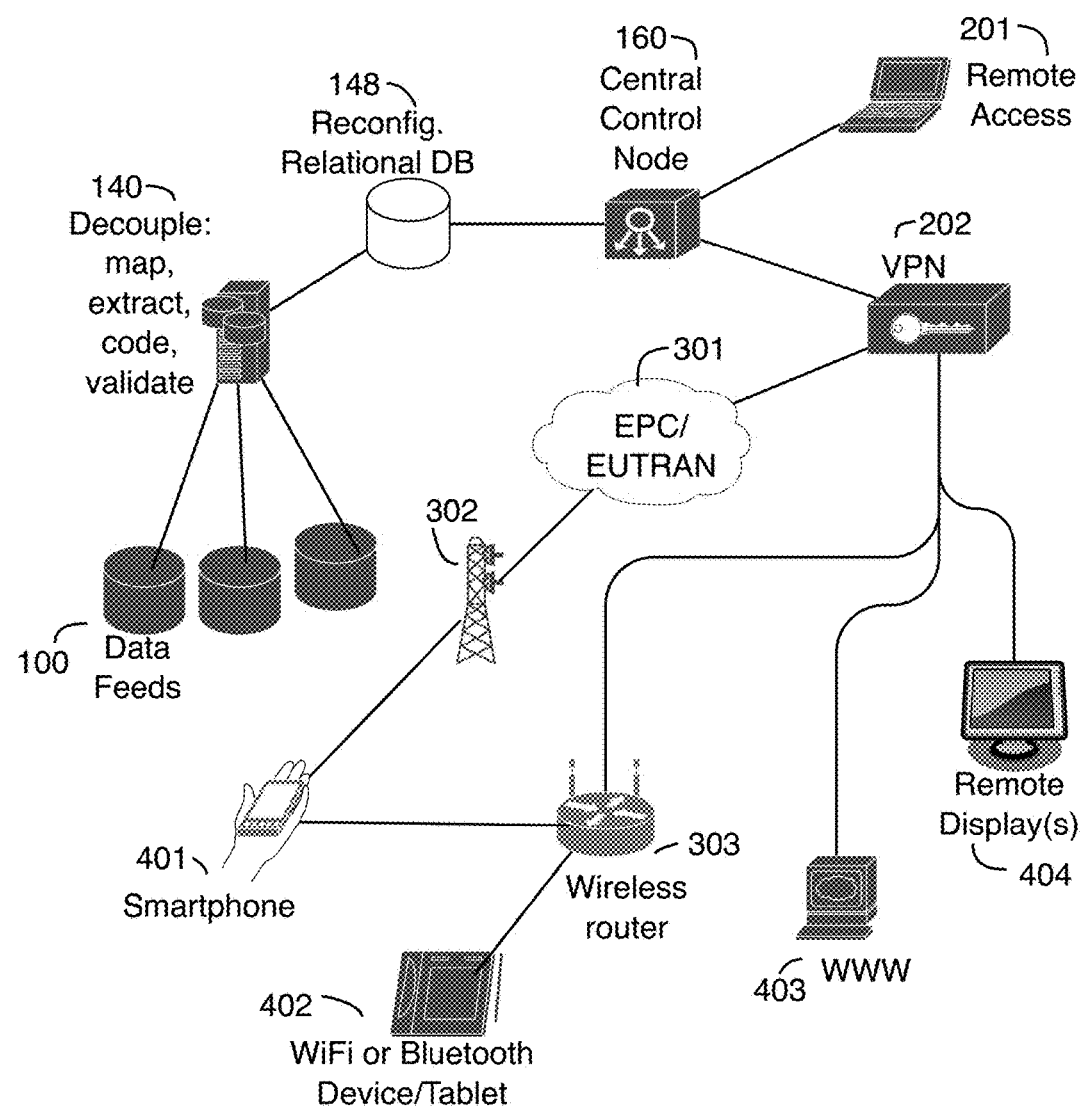
FIG. 4 is a graphic flowchart illustrating the central control node for monitoring and controlling the real-time data feeds, database management, data decoupling and output selection, device detection feedback, output data feed distribution to a display device, and the updating of output data feeds for repurposing a display device.

FIG. 4 is a graphic flowchart illustrating the central control node for monitoring and controlling the real-time data feeds, database management, data decoupling and output selection, device detection feedback, output data feed distribution to a display device, and the updating of output data feeds for repurposing a display device.

Data feeds 100 are shown feeding into database server 140 to convert external data into mapped, extracted, coded, and validated (MECV) data. External data feeds 100 represent heterogeneous data sources that require specific ontologies to resolve the semantic conflicts inherent in the data sources. Server 140 is used to detect the format of the incoming external data feeds 100, and to convert and validate the data into a data structure useable by the inventive system and processes. External data feeds 100 as source data will necessarily include variables specific to the originating source, including for example hardware standards (Variable 1, Var1), operating system data handling standards and file handling standards (Variable 2, Var2), and program/application handling standards (Variable 3, Var3).

Server 140 feeds into Reconfigurable Relational Database (RRDB) 148 to achieve data integration processes necessary for the present invention. Data integration processes for periodically taking data from heterogenous sources and loading into one or more target database(s) include the steps of: (1) data mapping; (2) code generation to create and/or update transformation programs to extract and load the target record data; (3) verification, which includes the subprocesses of checking the accuracy of translation, checking the completeness of the translation, and checking to ensure that the loaded data is supported in the new system; and (4) cleaning, which can include the subprocesses of checking compliance with Quality of Data standards, eliminating redundant data, removing obsolete data, and matching the new data structure requirements for the data at the target/destination/DB.

Also contemplated within the scope of the invention, as an alternative or partial process alternative to a Data Integration Conversion program or Master Data Recast program, is the conversion to an intermediate data format such as tab delimited text files or common separated text files with subsequent export to the target format.

Reconfigurable Relational DB 148 uses standard Data Markup Language (DML) database programs includes Sybase, MySQL, DB2, SQL server, and Oracle. It is also contemplated as within the scope of the invention to use a Data Hub and/or a Data Lake approach in place of structured relational data warehouse approaches. Also, data integration is illustrated using a single DB server and a single relational DB. However, in practice, data integration solutions commonly use multiple forms of virtualization, including virtual servers and virtual databases, which are contemplated as within the scope of the invention. The use of adapters, software applications, and recasting to tag or wrap data and data sources provides a solution to the problems arising from heterogeneous sources. Data virtualization and data federalization provide the user the ability to handle data from disparate sources.

Central Control Node (CCN) 160 is used by the database administrator. Database tools and utilities within the CCN 160 allows the administrator to configure and manage the DB 148. Database parameters may include specifying the path of an input file, adding system identifiers, identifying port numbers for listener servicing, assigning hostname for the DB, user names and passwords, scheduling, mail and notification control, connecting and configuration of networks, servers, and hosts, upgrading software and features, restoring files and database information, library location, virtualization configuration, virtualization management, virtualization information, reporting requirements, and so forth. Additionally the CCN 160 provides additional configuration control, including type, size and capability of the computing engine, persistance parameters, encryption, input and output parameters, latency, load balancing, OS support, compliance, security, maintenance, billing, autoboot backup take-over in case of failure, and the like.

Remote access 201 includes a secure off-site desktop, laptop, tablet, or smart device that provides an administrator with access to control and manage the CCN 160.

Virtual Private Network (VPN) 202 is optionally connected in some preferred embodiments to the CCN 160 to address some of the virtualization needs of the system.

Output from the inventive system is then delivered to external target devices with distribution according to the specific target destination device. In the example of a smartphone, connection is through a cellular network such as the LTE (Long term Evolution) Evolved Packet Core (EPC) and the Evolved UMTS Terrestrial Radio Access Network (E-UTRAN) 301 which uses radio towers 302 to carry allotted signals to the smartphone 401. In another example contemplated as within the scope of the invention, distributed connection is by way of a wireless router (WiFi) 303 and is used to connect either a smartphone 401 or a WiFi (or Bluetooth or similar) device or tablet 402. In yet another example contemplated as within the scope of the invention a remote display 404 is connected, by wire or wirelessly, to receive the output data.

Figure 5:
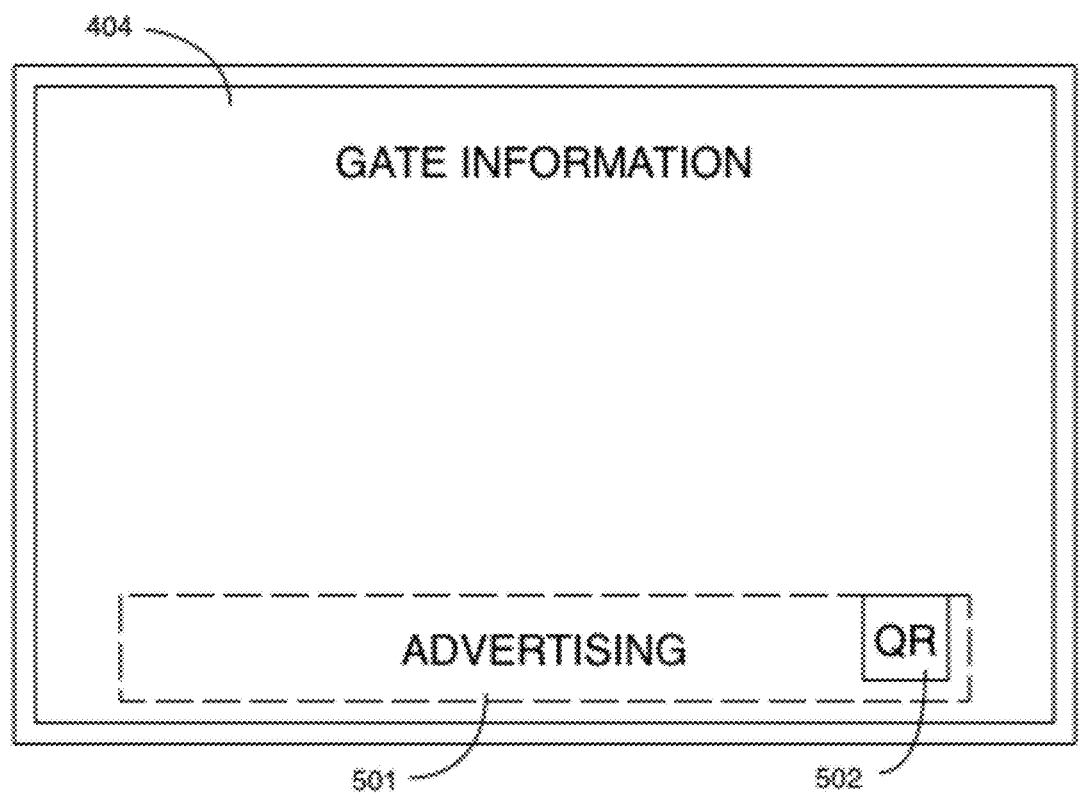
FIG. 5 is a graphic of a display illustrating a possible re-purposed use of one part of the display "real estate" centrally distributed for advertising use, and centrally distributed with one or more a QR codes.

FIG. 5 is a graphic of a remote display 404 illustrating a possible re-purposed use of one part of the display "real estate" centrally distributed for advertising use 501, and centrally distributed with one or more a QR codes 502. As stated above, electronic real-time control of each display's real-estate, that is driven by specific passenger level data analytics, and used to optimize airport revenue by sending targeted advertising that is pushed out to the Smart Remote Displays near the passengers arrival or departure gate has not been available. Where an advertising entity has identified specific customer classes or even specific customers as being in their target profile or market, airports are provided with the added benefit of higher airport advertising revenues while increasing airport passenger throughput, and Advertisers receive less wasted blanket advertising.

Figure 6:
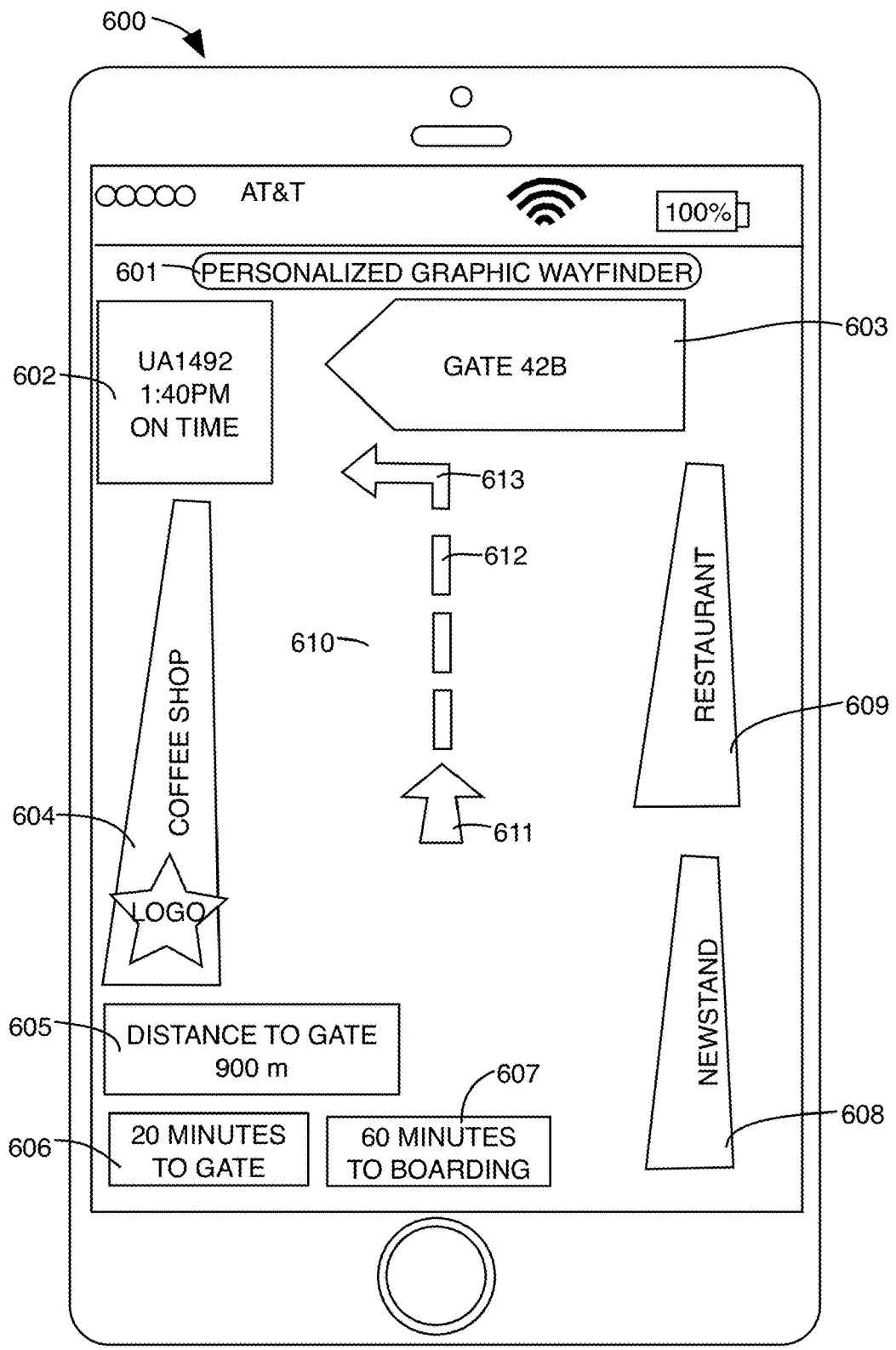
FIG. 6 is a graphic representation of a smartphone screen showing a Virtual Wayfinder application providing re-aggregated filtered device-modified special purpose output data relating to flight time, flight status, gate information, gate status, georeferencing information, vendor information, and subscriber/member information.

FIG. 6 is a graphic representation of a smartphone screen showing a personalized Virtual Wayfinder application 600 providing re-aggregated filtered device-modified special purpose output data relating to flight time and flight status 602, gate information 603, gate status 607, georeferencing information 605, 606, 610, vendor information 604, 608, 609, and subscriber/member information 601. Flight time and status 602 is an illustration that the flight is United Airlines (UA) flight 1492, departing at 1:40 pm, and has a flight status of on-time. Flight time and status 602 is MECV flight arrival and departure information 121 that is converted from airline feed 101. Gate information 603 is an illustration that the flight is departing from GATE 42B. Gate status 607 is an illustration that the flight boarding time is in 60 minutes. Gate information 603 is derived from MECV gate information 122 and MECV gate location information 129 converted from check-in feed 102 and gate information feed 109. Gate status 607 is also taken from MECV gate information 122 and MECV gate location information 129 converted from check-in feed 102 and gate information feed 109.

Georeferencing distance information 605 indicates that the passenger is 900 meters from the gate. Georeferencing walking time information 606 indicates that the passenger is 20 minutes from the gate. Both distance information 605 and walking time information 606 are derived from a measurement of the passenger's location, e.g. passenger's smartphone interfacing with the travel operations display system using WiFi, Bluetooth, or a similar mounted wireless transceiver subsystem, compared to the fixed location of the gate and the non-linear walking path between them. Distance 605 is updated as the passenger advances down their pathway. Although distance 605 will usually only vary because of maintenance or construction detours, walking time 606 will vary depending on the rate of speed of the passenger as detected by remote sensors, how busy or crowded the walking path is (volume), and TSA screening/security checkpoint delays.

Distance data 605 and/or walking time data 606 may be linked to Boarding Time data 607 to generate a Boarding Compliance report that is monitored by the system. If the Boarding Compliance report indicates a lowering in the passenger's probability of successfully reaching the gate in a timely manner, a report can be generated and sent to the Gate, to the Airline, to TSA security, and to Baggage, etc. A graphic alert can be sent to notify the passenger of the lowered probability of timely arrival to the boarding gate, so that the passenger can make arrangements to get back on track to successfully arriving at the Gate on time, or the passenger can use the Alert and Notification to communicate that an issue has arisen preventing them from making it to the Gate in a timely manner.

The graphic alert and notification can be programmed to provide alert preferences where the alert may include a color change to the graphic, a sound alert, a recorded message, and the like depending on passenger preferences or airport demands, The color change to the graphic can be programmed to change in direct relation to the probability of timely Gate arrival by the passenger.

If the system detects, and/or the passenger confirms, that the passenger will not make to the Gate on time for boarding, the Gate report allows the Gate personnel to be able to immediately and efficiently offer Stand-By Seating to other passengers. The Airline Gate report allows the airline to obtain an accurate passenger count for aircraft load balancing. The Baggage Gate report allows baggage handlers to remove and secure an unattended bag for later pick up by the passenger. The TSA Gate report allows security and/or public safety personnel to increase monitoring to provide any needed assistance for a passenger in need, e.g. medical attention, and/or avoid attempted criminal activities within the airport facility, e.g. transport of an unattended bag.

Vendor and concession graphics such as coffee shop 604, newsstand 608, or restaurant 609 indicate that a passenger has various vending, concessions, or amenities, e.g. family bathroom, available to them immediately adjacent their location in real-time as they move through the airport facility.

Way-finding arrow 610 also provides a passenger with the real-time capability to quickly, accurately and successfully navigate through an unfamiliar airport without relying on airport signage that may be in a different language, or that may be out of date due to construction or maintenance detours and the like. Wayfinding arrow 610 is illustrated in this non-limiting embodiment as a first proximal arrow 611 leading to a series of dashed lines 612 that connect to a second distal arrow 613. However, the invention contemplates the use of any graphic indicators that provide first-person view information to aid in navigating the internal or external space or terrain that is covered within the boundaries of the system. In alternative examples, the graphic may consist of a compass personalized to the user's gate or target location within the facility, a direction indicating gauge or dial, a bore-sight type of indicator, an animated creature or person to be followed, various graphic animated objects such as an airplane, footprints or animated shoes, words, logos, a mascot, a bouncing ball, a photorealistic object, combinations of such graphic elements, and so forth. It is contemplated as within the scope of the invention that various colors and shapes may be used to convey additional information such as time/urgency, distance, direction, and obstacles. Size and proportionality may be varied according to user preferences and/or need due to visual impairment.

It is also within the scope of the invention that various sounds and spoken words would be used in combination with the wayfinder assistive feature. Alerts, warnings, and advice may be programmed and available depending on a user's preferences. Additionally, a tone-based way-finder may be implemented to assist the visually impaired. Tones may be long tones, short tones, or ticking sounds to provide directional assistance. For example, user who is on-track might hear a specific tone, e.g. a steady tone, or lack of a tone. However, if they veer from the correct path through the facility, second and third tones might be used. Tone based radio navigation systems are well known in maritime, aviation, and space-based systems. However, the inventive system provides the use of low-power, facility-mounted transponder beacons, in combination with a user's cell phone, which of course has cellular, wifi, bluetooth or other radio antenna transceiving systems, and a geolocating facility having a database system with the ability to push or pull graphic-data for graphic generation on a user's device.

Figure 7:
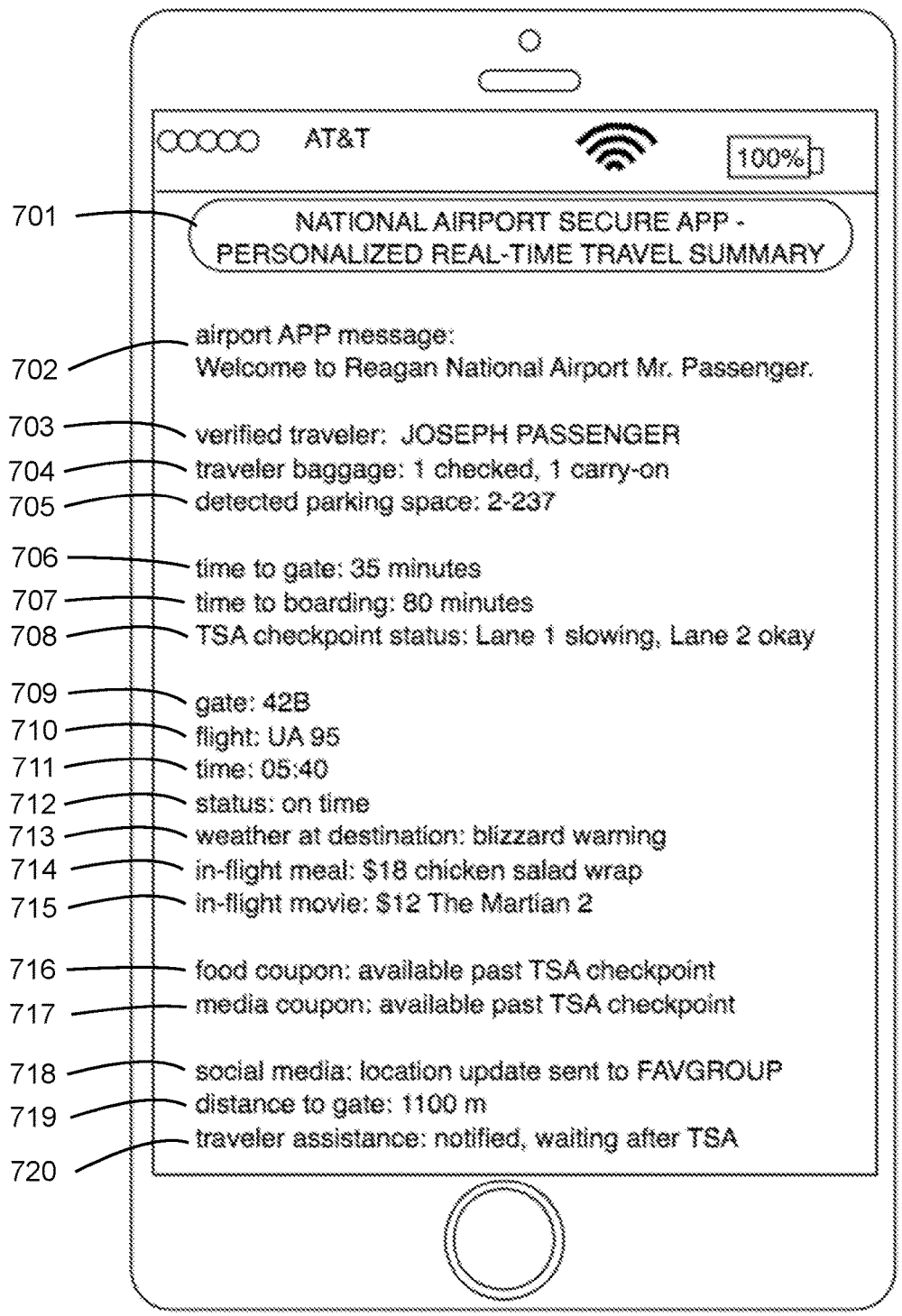
FIG. 7 is a graphic representation of a smartphone screen showing re-aggregated filtered device-modified special purpose output data relating to geo-tagged transportation/parking information, gate status, flight status, TSA checkpoint status, vendor options, flight information, weather information, and in-flight options and information.

FIG. 7 is a graphic representation of a smartphone screen showing re-aggregated filtered device-modified special purpose output data relating to geo-tagged transportation/parking information, gate status, flight status, TSA checkpoint status, vendor options, flight information, weather information, and in-flight options and information. FIG. 7 illustrates how the present invention can provide a Personalized Real-Time Travel Summary (PRTS) 701 in an easy to read format. The PRTS may include a welcome message 702 from the airport or facility. Verified traveler data 703, and traveler baggage information 704 are sent from the control node/relational database responsive to either a push and/or pull request transmitted over the system. Detected parking space data 705 is obtained from the beacon-subsystem, or may be input using RFID, QR code or bar code, or from input by the user. All of this information is saved to a passenger profile stored within the system. Time To Gate (TTG) data 706, Time To Boarding (TTB) data 707 and Security Checkpoint Status (TSA) data 708 are generated using the location of the user's cell phone or smart device and computing the output using appropriate input variables. For example, TTG data 706 is calculated by dividing walking speed by pedestrian distance to the specific gate 719 according to measurable, known distances stored in the relational database. This value may be varied, plus or minus, by comparing to actual beacon measurements as the passenger moves through the facility, aggregate crowd-flow data, security or safety data, and variables from the user's profile such as disabilities, injuries, age, and so forth as provided by the user. Aggregate crowd-flow data, such as conveyance and beacon-monitoring feeds 113 from FIG. 1, are collected from a large enough sample of individual user/passenger movement tracking beacons within the facility to provide the operator with models of crowd-flow through the facility. The system operator can select the sample size depending on QoD requirements. Extracting a sub-sample model of a crowd-flow model path based on a passenger's target destination and comparing the distance to the gate 719 and target destination crowd-flow against the user's location allows the system to provide an estimate of the TTG data 706. The invention contemplates that other ways of collecting, comparing, and reporting such TTG information are within the scope of the invention.

Time To Boarding (TTB) 707 is data transmitted from the system as part of the user PRTS 701 and that is derived from input data 120 from FIG. 2. The TTB data is often boarding time data provided as a gate information feed 109. It is contemplated that the system may also include additional information, either from the system operator/control node, or from other feeds such as public safety feed 105, etc.

Security Checkpoint Status (TSA) data 708 are generated using the location of the user's cell phone or smart device and computing the output using appropriate input variables. In one example, the speed and volume of passenger's through the TSA lanes associated with the user's boarding gate or arrival gate can be input. This input may be plotted to provide an estimated checkpoint speed and volume at the time that the user is estimated to arrive at the checkpoint from the user's current position within the facility. User tracking is provided as previously described herein. Additionally, TSA data 708 may be assigned specific categorical quality indicators depending on the checkpoint speed and client/passenger throughput volume. An empty checkpoint may be assigned an indicator of "No Wait" while a checkpoint having standard speed and volume may be labelled "Okay", and a checkpoint where the speed is below standard and/or the volume is above standard may be assigned a designator of "Slowing", or similar. This TSA data 708 may be generated by a checkpoint vendor, e.g. TSA, another 3rd party QoS metric vendor, from aggregated user device data, or from the facility. This TSA data 708 may also be supplied to checkpoint personnel for monitoring their own progress, staffing, problems, etc.

Gate data 709 is data transmitted from the system as part of the user PRTS 701 and that is derived from input data 120 from FIG. 2. The Gate data includes boarding data, standby status and availability, aircraft cleaning and re-stocking data, and so forth, as provided as a gate information feed 109, conveyance, e.g. wheelchair or electric cart, data 113, airline feed 101 and air traffic control 122. It is contemplated that the system may also include additional information, either from the system operator/control node, or from other feeds such as public safety feed 105, etc. Traveler assistance data 720 is an example of how the system can identify passenger needs and in a unified system, provide for bidirectional (duplex) communication notices to user, system, and other stakeholders, to provide a necessary service in a seamless and efficient manner.

Flight number 710, flight time 711, and flight status 712 are provided by airline feed 101. In-flight meal 714 and in-flight movie 715 may be provided from airline feed 101 or from terminal specific feeds 104. Weather data 713 is provided from weather feed 107, but may also be provided from television feed 108. Food coupon 716 and news/media coupon 717 are examples of data that interface with vendors and may be provided from terminal specific feed 104 and/or vendor feeds 110.

Figure 8:
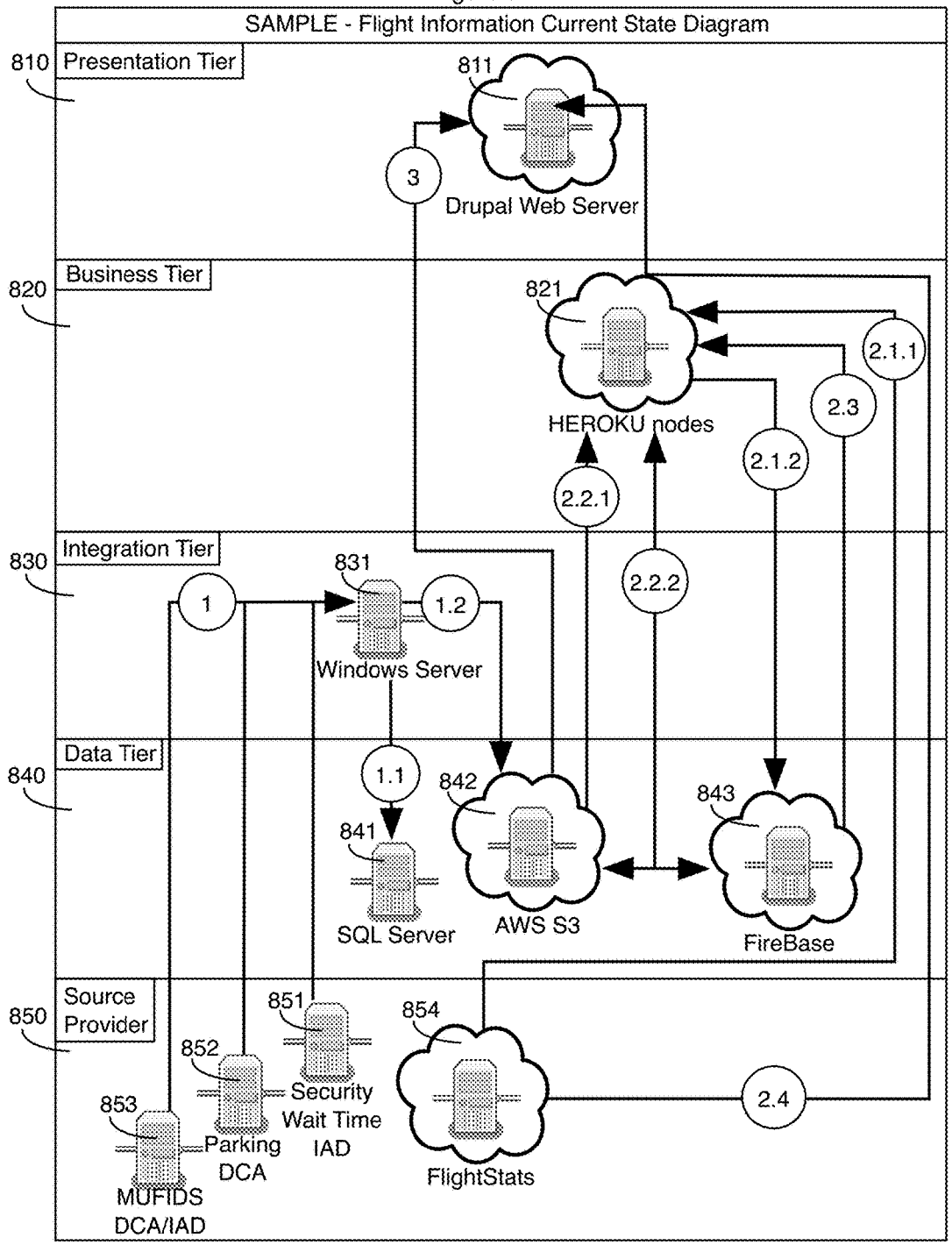
FIG. 8 is a graphic flowchart of a flight information current state diagram and illustrates a five-layer logic diagram comprising source provider layer, data tier layer, integration tier layer, business tier layer, and presentation tier layer, and shows the logical interconnection of feed sources that use ftp into DB servers that report to a secure AWS server along with a Heroku db and server and FireBase db and server with Heroku connection to a FlightStats db and server.

FIG. 8 is a graphic network illustration and shows among other things in a State Diagram how the system allows an airline to remotely access the status and settings of a remote travel operations display system via the Internet. FIG. 8 illustrates in one non-limiting example how the system 800 is comprised of numerous interconnected elements. In one non-limiting preferred embodiment, these elements are logically and conceptually categorized into five (5) Tiers, namely the Presentation Tier 810, the Business Tier 820, the Intergration Tier 830, the Data Tier 840, and the Source Provider (Tier) 850.

As a structural overview, Presentation Tier 810 comprises a Drupal web server 811 connected to the Internet. The web server 811 is programmed to access the remote travel operations display system 800 via the Heroku node 821. Heroku node 821 is logically located in the Business Tier 820 and is connected to Amazon Web Services S3 (AWS) 842, FireBase 843, and FlightStats 854. AWS 842 and FireBase 843 are logically located in the Data Tier 840 as can be seen in FIG. 8. FlightStats (Server) 854 is logically located in Source Provider Tier 850. AWS 842 is connected to Windows Server 831 located in Integration Tier 830. Windows Server 831 is connected to SQL Server 841 logically located in Data Tier 840, and is connected to facility servers Multi-User Flight Information Display System (MUFIDS) DCA/IAD 851, Parking DCA 852, and Security Wait Time IAD 853.

Drupal web server 811 uses an open-source modular content management framework to install, administer, and manage websites. Drupal, as a Content Management System (CMS), provides user account registration and maintenance, menu management, RSS feeds, taxonomy, page layout customization, and system administration. Drupal is written in PHP computing language, runs on any computing platform, and supports both web server functions and database storage and configuration.

Drupal's web server 811 features include access statistics and logging, searching, user profiles, multi-layer access control restrictions, workflow triggers and actions, multi-level menus, support for multiple sites, multi-user access for content creation and editing, feature throttling to enhance performance, descriptive URLs, RSS feeds, blogs and forums, and OpenID authentication support. Drupal's database functions use PHP data objects to abstract the database (Drupal 7), thus avoiding the need to write SQL queries as text strings.

Heroku node 821 is a cloud-based Platform As A Service (PAAS) that provides the system administrator to deploy, run, and manage applications (source code program) written in various computer languages, including Ruby, Node.js, Java, Python, Clojure, Scala, Go, and PHP. Heroku functions can be divided into two buckets: (1) application development and deployment, and (2) runtime operation of the Heroku platform and post-deployment functions of the application.

In Heroku deployment, the Applications consist of source code, dependencies, and a Procfile. Procfiles list process types—named commands that you may want executed. Deploying an application involves sending the application to Heroku using either git, GitHub, Dropbox, or via an API. Buildpacks lie behind the slug compilation process. Buildpacks take your application, its dependencies, and the language runtime, and produce slugs. A slug is a bundle of your source, fetched dependencies, the language runtime, and compiled generated output of the build system—ready for execution. Config vars contain customizable configuration data that can be changed independently of your source code. The configuration is exposed to a running application via environment variables. Add-ons are third party, specialized, value-added cloud services that can be easily attached to an application, extending its functionality. A release is a combination of a slug (your application), config vars and add-ons. Heroku maintains an append-only ledger of releases you make.

In the runtime operation of the Heroku platform 821, containers called Dynos are isolated, virtualized unix containers, and are used to provide the environment required to run an application. An application's dyno formation is the total number of currently-executing dynos, divided between the various process types that have been scaled. The dyno manager is responsible for managing dynos across all applications running on Heroku. Applications that use the free dyno type will sleep after 30 minutes of inactivity. Scaling to multiple web dynos, or a different dyno type, will avoid this. One-off Dynos are temporary dynos that run with their input/output attached to the local terminal. Each dyno is loaded with the latest release. Each dyno gets its own ephemeral filesystem—with a fresh copy of the most recent release. These can be used as temporary scratchpad, but changes to the filesystem are not reflected to other dynos. Logplex automatically collates log entries from all the running dynos of the app, as well as other components such as the routers, providing a single source of activity. Scaling an application involves varying the number of dynos of each process type.

AWS S3 842 is the Amazon Simple Storage Service (S-S-S=S3) part of the Amazon Web Services (AWS) suite of cloud computing services, and provides scalable, large capacity storage and computing without needing to build a physical server farm. AWS itself consists of 9 main product areas that comprises a total of over 70 different services. The nine main product areas include computing, networking, content delivery, storage and content delivery, database, deployment, management, application services, and analytics. AWS S3 services use hypertext transfer protocol (HTTP) as the access protocol for accessing over the web, and use the Representational State Transfer (REST) architecture, Simple Object Access Protocol (SOAP) protocol, and BitTorrent. The REST architecture is the same architecture of the world wide web (WWW) and uses the HTTP communication protocol with HTTP verbs (GET, POST, PUT, DELETE) and Uniform Resource Identifiers (URIs) to identify web resources and interface with external systems. The SOAP protocol specifies the exchange of structured information using the XML Information Set for formatting (envelope, header, body) and application layer protocol HTTP and SMTP to negotiate and transmit information. BitTorrent is a peer-to-peer file sharing communication protocol which spreads transmission and receipt of data over multiple peer client computers called Seeds. BitTorrent is a low-bandwidth way of transmitting large amounts of data by having the user transmit or receive a file that is described in a small torrent descriptor file with the original file broken into equal sized segments, encrypted, and transmitted non-sequentially through a swarm/group/network of connected peer computers. The torrent descriptor file allows correct reassembly of the file at the destination and allows removes any time requirements or continuity requirements typical of a standard upload or download.

FireBase 843 is a database product from the Google company that is a platform for storing and syncing data in a JavaScript Object Notation (JSON) database in real time. Firebase is provided as a cloud service and is a Backend-As-A-Service (BAAS) provider. Firebase provides a real-time database with an Application Programming Interface (API) that allows storing and syncing data across multiple clients. JSON is a lightweight data-interchange format that uses normal (human-readable) text to transmit data object consisting of attribute-value pairs. JSON is denied from JavaScript but is now language independent. Unlike JavaScript, JSON allows line separator and paragraph separators (U+2028, U+2029) important for JSON padding, and thus JSON is not a strict subset of JavaScript. It is a common data format used for asynchronous browser/server communication, known as Asynchronous JavaScript And JSON (AJAJ), similar to how XML functioned for AJAX.

FlightStats 854 is a data services product that provides real-time global flight data to subscribers. Flight Status APIs contain over 300 data elements per flight record. These data elements may include scheduled departure/arrival times, estimated departure/arrival times, actual departure/arrival times, type of equipment, delay calculations, terminal information, gate information, baggage carousel information, departure performance for airports, flight on-time percentage, performance/delay index, degree of lateness probabilities, and weather information. In one preferred embodiment, FlightStats 854 provides Flight Identification Display System (FIDS) as an API in a standardized format via a streaming data feed using a simple request/response protocol.

FIG. 8 also shows how in one preferred embodiment the interconnected system works in operation. In STEP 1, File Transfer Protocol (FTP) files are transferred every three (3) minutes from Multi-User Flight Identification Display System (MUFIDS) 851, Parking DCA database/server 852, and Security Wait Time IAD database and server 853 to Windows Server 831. In STEP 1.1, files are inserted into SQL server for backup and for reporting purposes into SQL Server 841. In STEP 1.2, four (4) JSON files are sent every three (3) minutes with updates to the AWS S3 server 842.

Continuing with this non-limiting example, FlightStats 854 in STEP 2.1.1 sends a complete schedule for the day at e.g. 2:10 a.m. of the FlightStats information to Heroku node 821. Heroku node 821 then immediately reports schedule information to Firebase 843.

Then in STEP 2.2.1, AWS S3 updates Heroku node 821 every three (3) minutes. Following in STEP 2.2.2, Heroku node 821 merges the MUFIDS data with the schedule data every three (3) minutes, and then updates AWS S3 842 and Firebase 843.

Firebase 843 then in STEP 2.3 downloads the Merge data, and then feeds into AWS S3 842 via the Heroku node 821. In STEP 2.4, Heroku node 821 then performs a Flight Status Search of FlightStats 854 while Heroku node 821 updates the Drupal Web Server 811. Finally, in STEP 3, AWS S3 842 feeds Flight Information into the webpage at Drupal Web Server 811.

Figure 9:
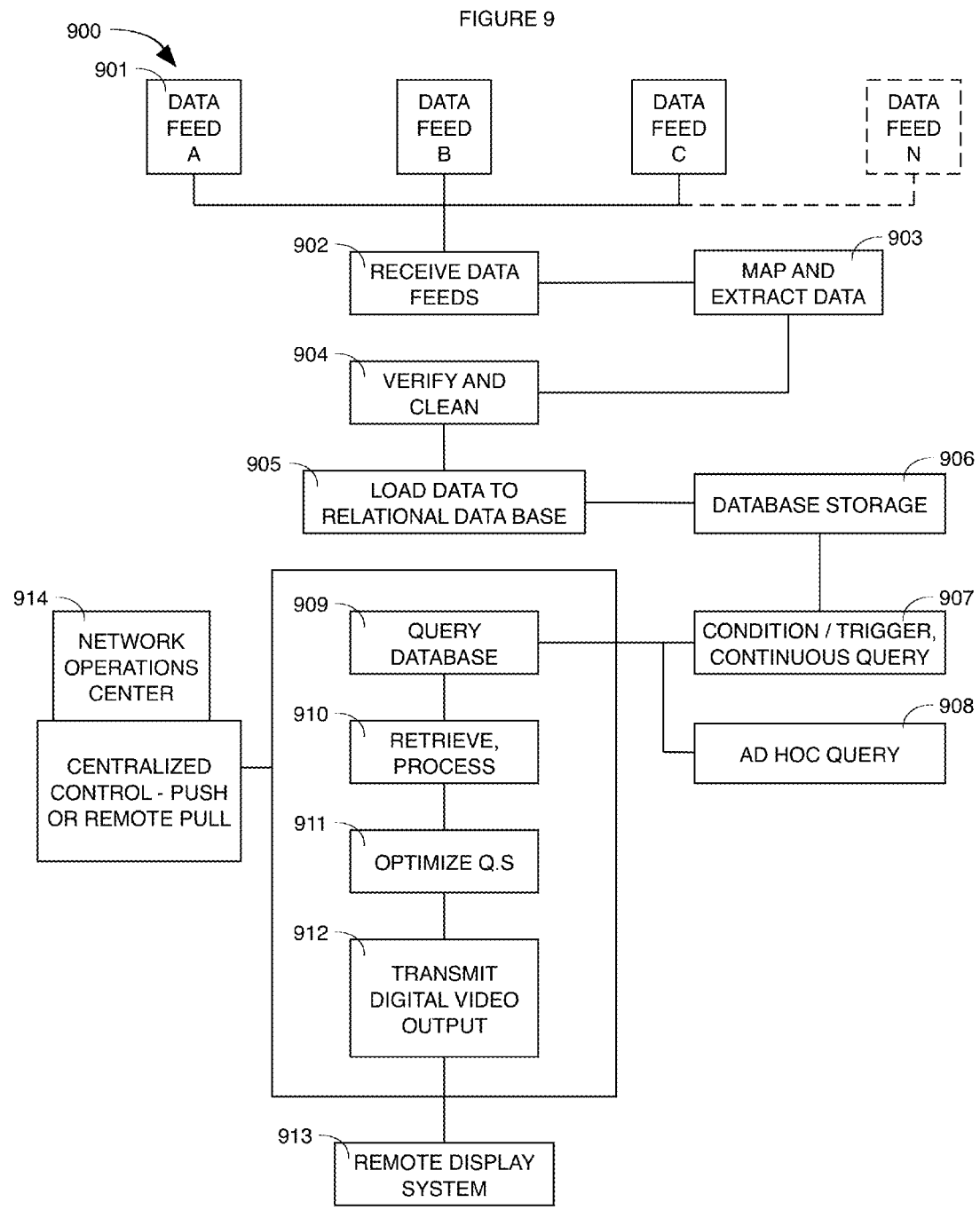
FIG. 9 is a flowchart diagram illustrating centralized control of information from the data feeds through the decoupling, coding, and validating process to create the new data structures and centralized control of the database storage, querying, collection, optimization, and transmission processes.

FIG. 9 is a flowchart process diagram 900 illustrating centralized control of information from the data feeds through the decoupling, coding, and validating process to create the new data structures and centralized control of the database storage, querying, collection, optimization, and transmission processes.

Data feeds A-n in STEP 901 are received by the system in STEP 902. STEP 902 may include specific ontologies to resolve semantic conflicts in the heterogenous data feeds A-n. STEP 902 transmits the data for processing in STEPS 903, 904, and 905 which detect the data format, converts the data to the specific DB data structure, and validating the processing. STEP 903 converts the data by detecting the data format, mapping and extracting the data. A direct conversion program may be used prior to exporting to the target format. Alternatively, an intermediate conversion program may be used to convert to tab deleted or comma separated text file prior to exporting to the target format. STEP 904 verifies and optionally cleans the data. Verification checks that translation was accurate, translation was complete, and that translational results in a format supported in the new DB data structure. Cleaning may include checking the data against Quality of Data (QoD) specifications, checking to eliminate redundant data, checking to eliminate obsolete data, and/or checking to match data to new reports. STEP 905 loads the data to the relational data base (DB) and STEP 906 stores the data to the server. STEP 907 illustrates how conditions, triggers, and/or continuous queries access the DB and pour their result into STEP 909 query DB. Ad hoc query in STEP 908 also provides for one-time reports or retrievals. STEP 910 retrieves and processes the requested data and STEP 911 optimizes the report or retrieval according to pre-specified parameters or Quality of Service (QoS) specifications. These parameters may include time, data structure, etc. required for the target destination's use of the data. STEP 912 illustrates how the data in this non-limiting example is transmitted as digital video output to a remote display system in STEP 913. STEP 914 is the centralized control by the Network Operations Center (NOC) whereby the output can be pushed out to the target display system. Alternatively, the system can include whereby the target output has a pull function for obtaining the target output from the DB.

Figure 10:
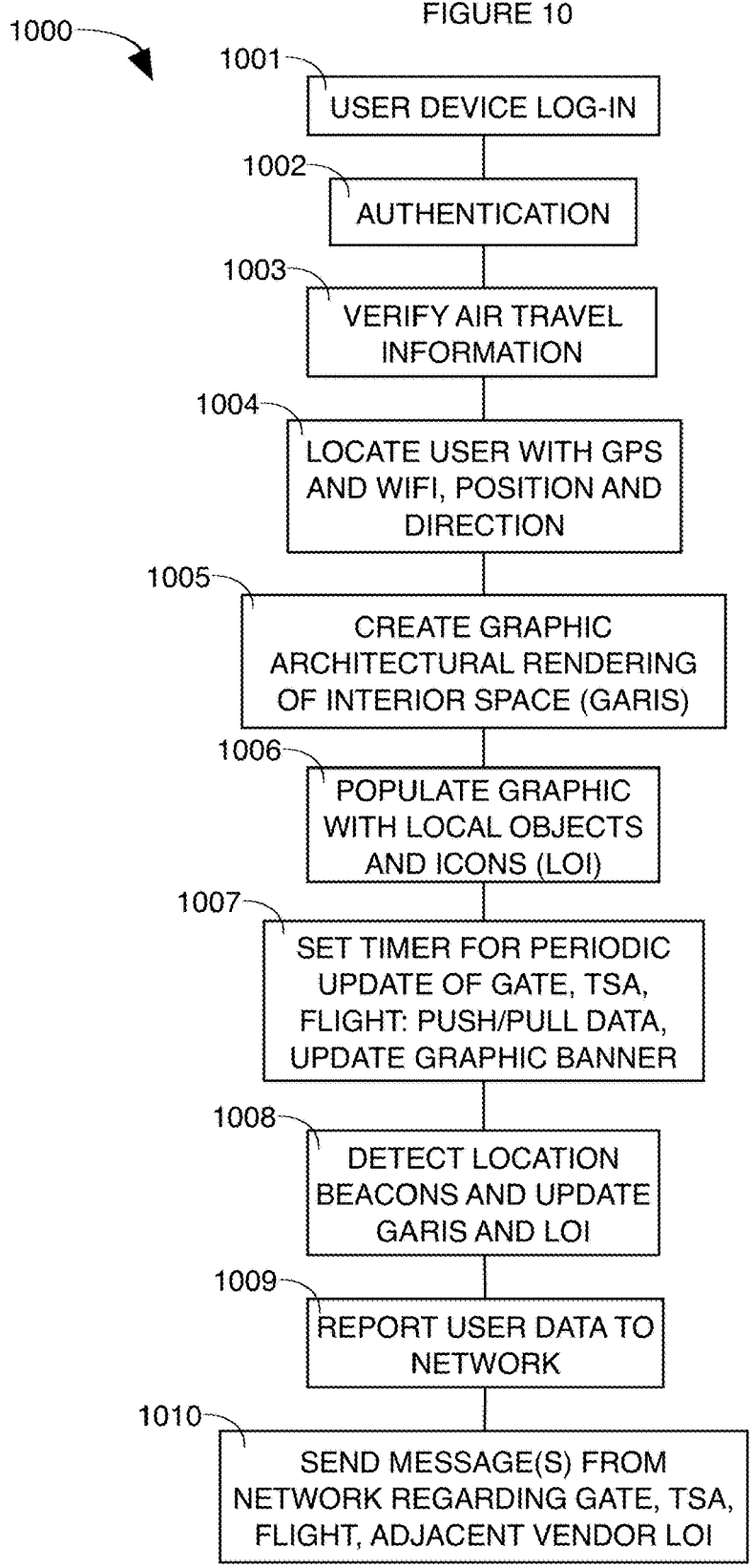
FIG. 10 is a flowchart diagram illustrating how an authenticated and verified user device can be located within a facility including position and direction, and how a personalized wayfinder system of the present invention can generate and transmit to the user device a real-time updated architectural graphic rendering of the user's location within the facility from the user's viewpoint and/or from a bird's-eye view and how the wayfinder system integrates user-centric travel-related information into the graphic rendering being provided to the user device, while providing the network with updated user location or other information.

FIG. 10 is a flowchart process diagram 1000 illustrating how an authenticated and verified user device can be located within a facility including position and direction, and how a personalized wayfinder system of the present invention can generate and transmit to the user device a real-time updated architectural graphic rendering of the user's location within the facility from the user's viewpoint and/or from a bird's-eye view and how the wayfinder system integrates user-centric travel-related information into the graphic rendering being provided to the user device, while providing the network with updated user location or other information. STEP 1001 is the user device log in and STEP 1002 is the authentication step for the user's device to access the system. STEP 1003 is the air travel information verification whereby the user and the user's device are checked against system DB records, e.g. records derived from airline feed 101, check-in feed 102, public safety feed 105, passenger screening feed 106, etc. STEP 1004 locates the user/user's device within the facility using GPS and WiFi, obtaining both position and direction. STEP 1005 creates the graphic architectural rendering of the interior space (GARIS) around the user, and transmits this to the user's device. STEP 1006 populates the graphic with local objects and icons (LOT). STEP 1007 sets the timer for periodic update of gate, TSA, flight data and so forth. STEP 1007 also updates the graphic sent to the user's device by pulling from the DB or receiving push notifications from the system/DB. STEP 1008 detects the movement of the user device or user using location beacons or other sensors, e.g. RFID, cameras, etc., and updates the GARIS and LOI information in the system and in the user's device graphic rendering. STEP 1009 reports user data to the network. The STEP 1009 reporting can be performed at each milestone, periodically, or continuously depending on operator determined settings. STEP 1010 sends message(s) from the network/system regarding gate, TSA, flight, etc. as well as nearby/adjacent vendor LOI as the passenger physically moves through the facility.

Figure 11:
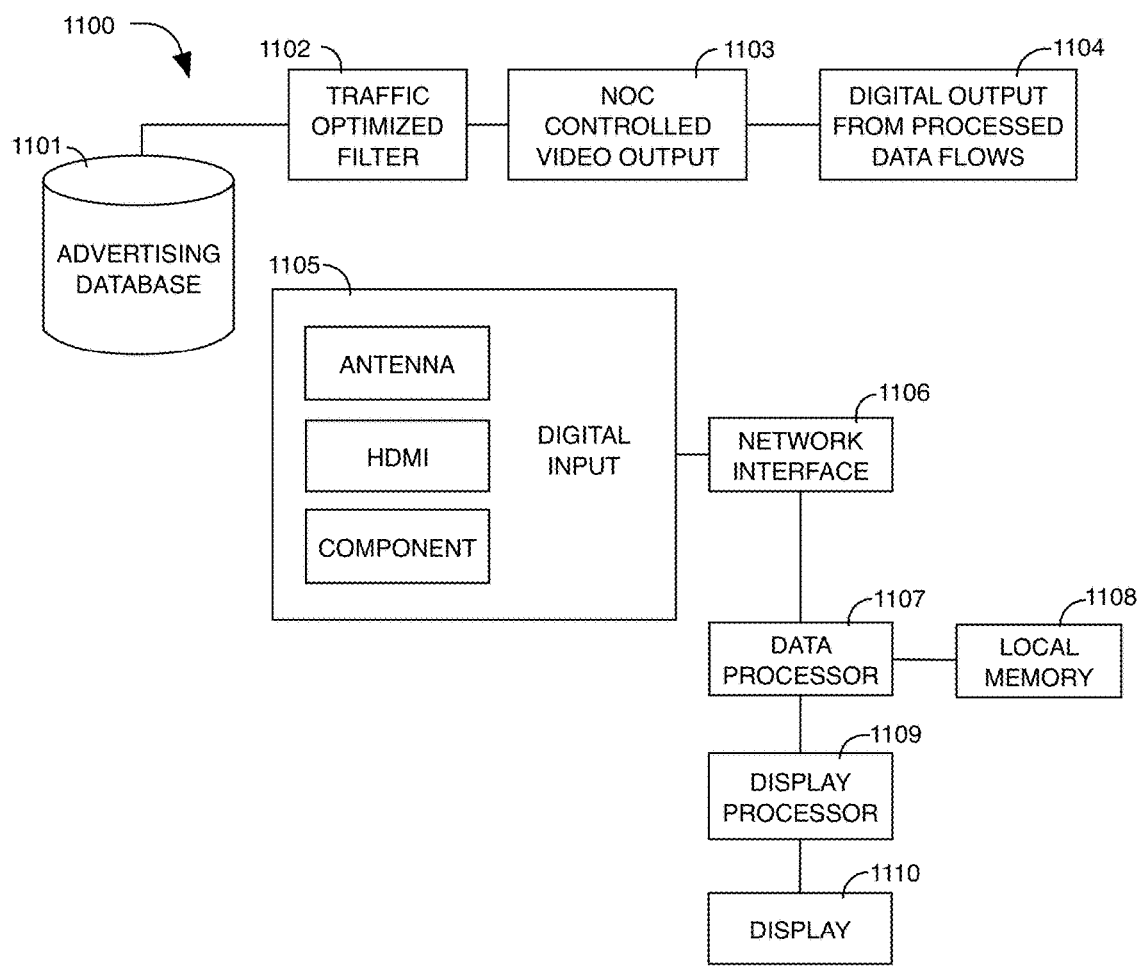
FIG. 11 is a flowchart diagram illustrating how advertising activity using a VPN-integrated or web-integrated advertising database can receive system user traffic information from a central node or NOC, which can then insert video-, audio-, or text-based advertisements into end-point user-facing display devices through appropriate network interfaces, and which uses the digital input from the processed data streams to update and/or tailor user-facing advertising or public service announcements.

FIG. 11 is a subsystem diagram 1100 illustrating how advertising activity using a VPN-integrated or web-integrated advertising database can receive system user traffic information from a central node or NOC, which can then insert video-, audio-, or text-based advertisements into end-point user-facing display devices through appropriate network interfaces, and which uses the digital input from the processed data streams to update and/or tailor user-facing advertising or public service announcements.

Advertising data base 1101 is connected to a traffic optimized filter 1102. Passenger traffic is generated by the physical movement of passengers through the facility. Passenger data traffic is generated as user's interact with the system. NOC controlled video output 1103 represents digital output from the processed data feeds 1104 and is sent to digital output 1105. Digital output device may include the necessary hardware for receiving, processing, and displaying the system output, such as for example, antenna(e), HDMI connections, component connections, etc. and hardware interface 1106, data processor 1107, local memory 1108, display processor 1109, and display 1110.

Figure 12:
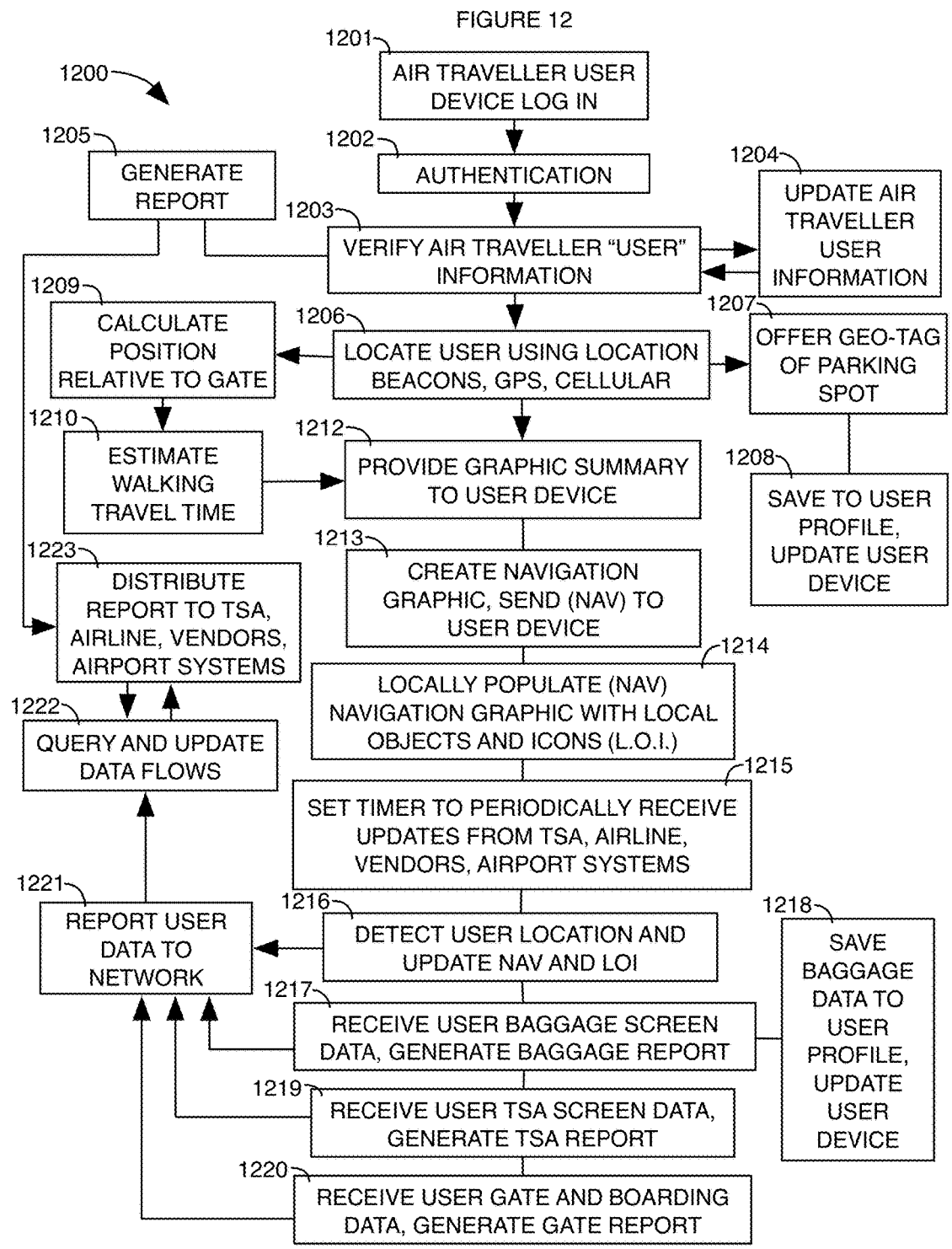
FIG. 12 is a flowchart diagram illustrating another embodiment of how an authenticated and verified user device can be located within a facility including position and direction, e.g. starting with a parking garage or lot, can offer information to the user such as parking, baggage, gate, security, airline, and vendors, and how a personalized graphic summary or wayfinder system of the present invention can generate and transmit to the user device a real-time updated graphic summary of the user's location within the facility and how the wayfinder system integrates user-centric travel-related information into the graphic rendering being provided to the user device, while providing the network with updated user location or other information.

FIG. 12 is a flowchart process diagram 1200 illustrating another embodiment of how an authenticated and verified user device can be located within a facility including position and direction, e.g. starting with a parking garage or lot, can offer information to the user such as parking, baggage, gate, security, airline, and vendors, and how a personalized graphic summary or wayfinder system of the present invention can generate and transmit to the user device a real-time updated graphic summary of the user's location within the facility and how the wayfinder system integrates user-centric travel-related information into the graphic rendering being provided to the user device, while providing the network with updated user location or other information.

STEP 1201 is the air traveler user device log in and STEP 1202 authenticates the user and use's device in the system for access to system services. STEP 1203 verifies the air traveler user information and generates a system report in STEP 1205 while checking to update the air traveler user information in STEP 1204. STEP 1206 locates the user using location beacons, GPS, cellular, and the like. STEP 1207 offers the user a geo-tag of their parking spot if the user is determined to be located in a parking facility, and STEP 1208 saves the parking information to the user profile, updating the user device and updating the system. STEP 1209 calculates the user position relative to the gate and STEP 1210 estimates walking travel time to the gate. STEP 1212 generates and provides a graphic summary, e.g. text, using the 1206 location and 1210 travel time, which is transmitted to the user device. STEP 1213 creates a navigation graphic (NAV), e.g. static or dynamic animation, using the summary 1212, and sends the NAV to the user device. STEP 1214 locally populates the NAV navigation graphic with additional local objects and icons (LOI) that are nearby the user's location. STEP 1215 sets a timer to periodically receive updates from TSA, airline, vendors, airport systems, and so forth, and STEP 1216 detects the user location and updates and transmits the NAV and LOI graphic. STEP 1217, STEP 1219, and STEP 1220 receive and update various information. STEP 1217 receives user baggage screen data, and generates a baggage report, which is reported in STEP 1221 in a user baggage data report to the network. STEP 1219 receives use TSA screen data, and generates a TSA report, which is reported in STEP 1221 in a user TSA data report to the network. STEP 1220 receives gate and Boarding data, and generates a report, which is reported in STEP 1221 in a user Gate and Boarding data report. STEP 1218 illustrates how baggage data, or TSA screening data or Gate and Boarding data, can be saved to a user's profile and the user device and system can be updated with the new information. FIG. 12 is illustrative and is intend to be a non-limiting example whereby persons of skill in the art understand that specific data feeds and processes may be fungible.

Figure 13:
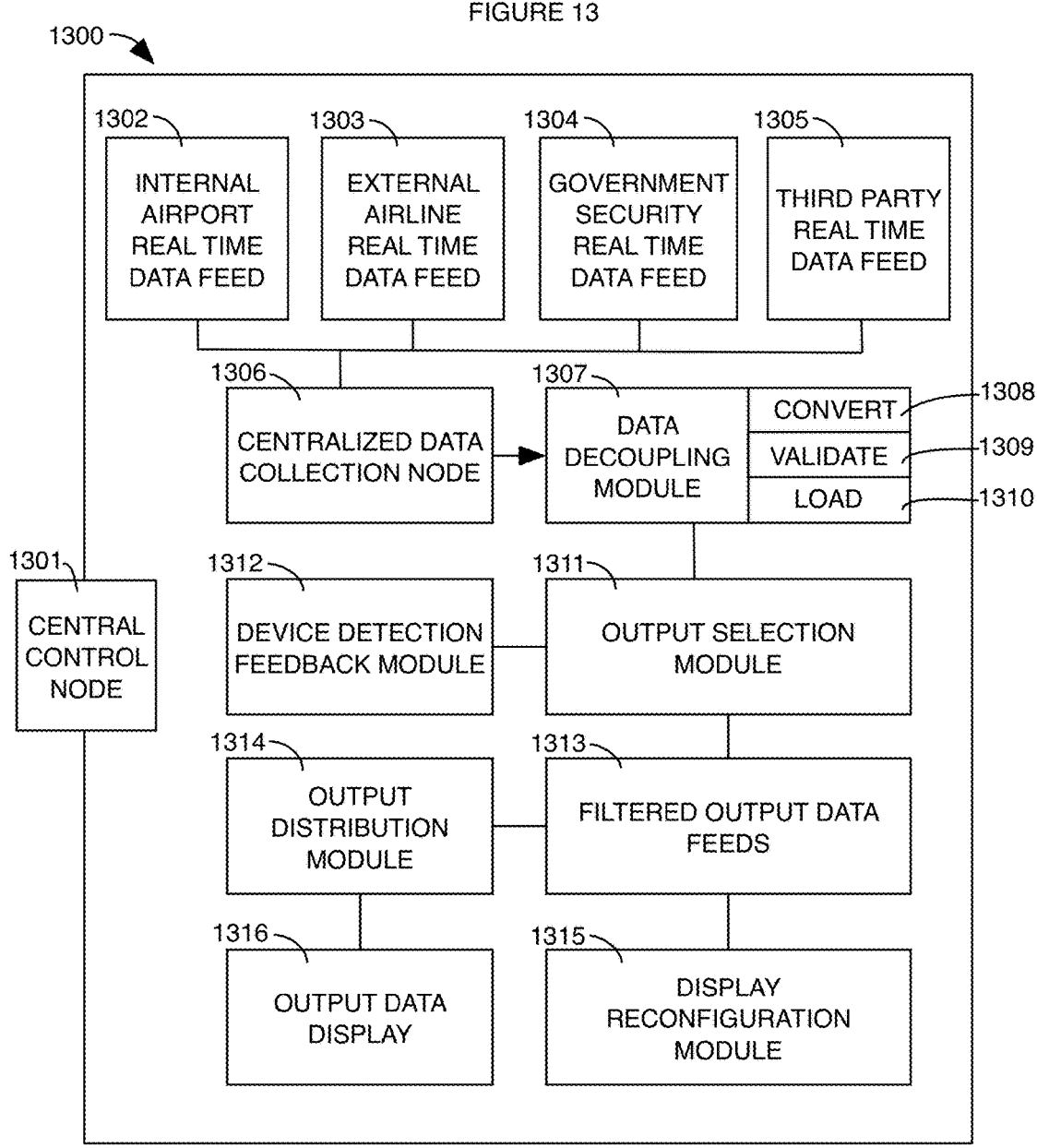
FIG. 13 is a flowchart diagram illustrating centralized control of the system from receipt of the external data feeds, to creating and updating a travel system database, to identifying the target output devices and creating device-specific output data, to transmitting to the target device(s).

FIG. 13 is a flowchart state diagram 1300 illustrating centralized control of the system from receipt of the external data feeds, to creating and updating a travel system database, to identifying the target output devices and creating device-specific output data, to transmitting to the target device(s).

In this non-limiting example, Central Control Node 1301, also known as Network Operation Center (NOC), system administrator, or operator, oversees, operates, administers, maintains, and updates the system 1300. Internal airport real time data feed 1302 external airline real time data fed 1303, government security real time data feed 1304, and third party real time data feed 1305 all communicate to the centralized data collection node 1306. The data decoupling module 1307 converts data 1308 by mapping and extracting data from the data feeds. Validation 1309 includes verification to ensure accurate, complete, and supported translations, and optional cleaning to eliminate redundant, obsolete or revising to update with matched data. Loading 1310 saves the data to the relational database and makes in available for use by the system. Output selection module 1311 selects the destination or target output device. Out selection module 1311 may be an automated subsystem whereby connected devices are routinely ping'd or queried to provide device information, connectivity information, and protocol information via the device detection feedback module 1312. Output selection module 1311 and device detection feedback module 1312 operate to tailor each specific output to each connected device to optimize efficient and quality data availability. The converted, validated, loaded, and optimized data feeds are transmitted to filtered output data feed module 1313 and output distribution module 1314 for transmission to the destination or target output data display unit 1316. Display reconfiguration module 1315 identifies when a device has changed, been substituted for a new device with the same user profile, has a change in or a degraded connectivity, or changes the access protocol, and reconfigures the data output in real time to optimize the efficiency and quality of the data availability.

Figure 14:
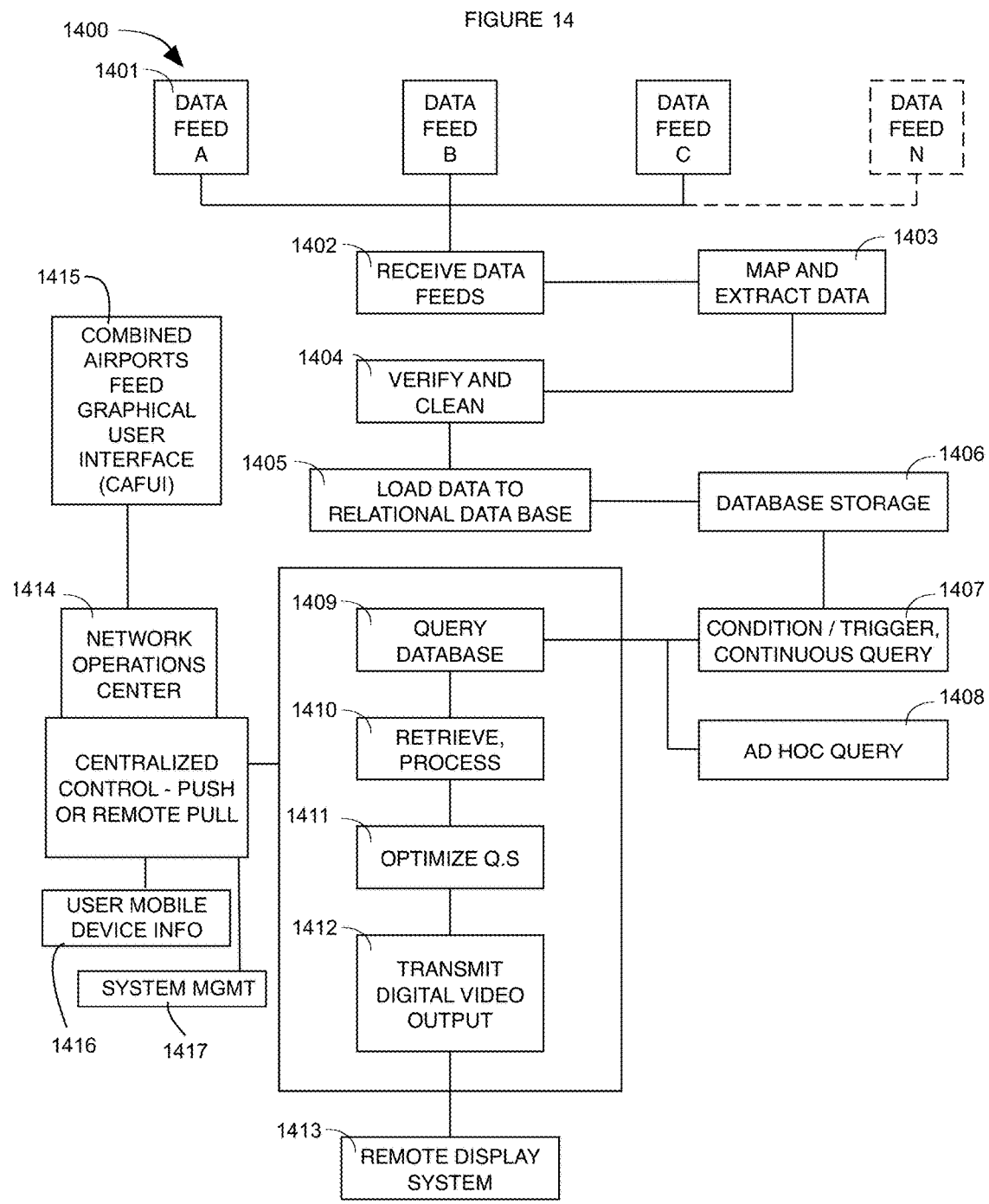
FIG. 14 is a block diagram showing control node/computer receiving external data feeds, decoupling such feeds by mapping and extracting, validating the decoupled data by verifying and cleaning, loading into the relational database, and generating a combined airport feeds user interface (CAFUI) for centralizing monitoring of the system, management of the system, and/or reporting on the system.

FIG. 14 is a block diagram showing control node/NOC computer 1414 receiving external data feeds 1401, 1416, 1417, decoupling such feeds 1403 by mapping and extracting, validating the decoupled data 1404 by verifying and cleaning, loading into the relational database 1405, and generating a combined airport feeds user interface (CAFUI) 1415 for centralizing monitoring of the system, management of the system, and/or reporting on the system 1400.

In preferred embodiments, the CAFUI 1415 provides a single, centralized display presenting data feed information 1401, 1416, images related to the data feed information, and/or management tools 1417. Presentation may include raw processed feed data, graphic representations of raw processed feed data, and graphic representations of combined feed data by type, location, feed originator, processed feed destination, and so forth. At the system level, one type of data feed within the scope of the present invention, is user data 1416. User data includes user identification, user mobile device information e.g. IMSI, RUIM, user mobile device location by nearest beacon or beacon triangulation, user mobile device location by GPS, user baggage information, user air travel information including airline, flight, time, origin, destination, user promotions e.g. mileage programs, user mobile device battery level, user profile information, user special needs, e.g. wheelchair, unaccompanied minor, etc. Non-limiting examples of system management tools include tools for generating summary reports, generating detailed reports, communicating to stakeholders within the private network as well as to outside 3rd party stakeholders about such information, requesting updates, sharing links to all or part of the user interface with personnel and/or 3rd parties, performing diagnostic checks, loading and running software scripts, adding, modifying or deleting destinations and devices that receive data feeds, pushing text, audio messages, and/or links to all or part of the user interface to one or more specific destinations or devices within the system, archiving and backing up, monitoring and managing connections to outside networks, monitoring and managing network intrusions and security, setting alerts and/or reporting parameters, and so forth.

Figure 15:
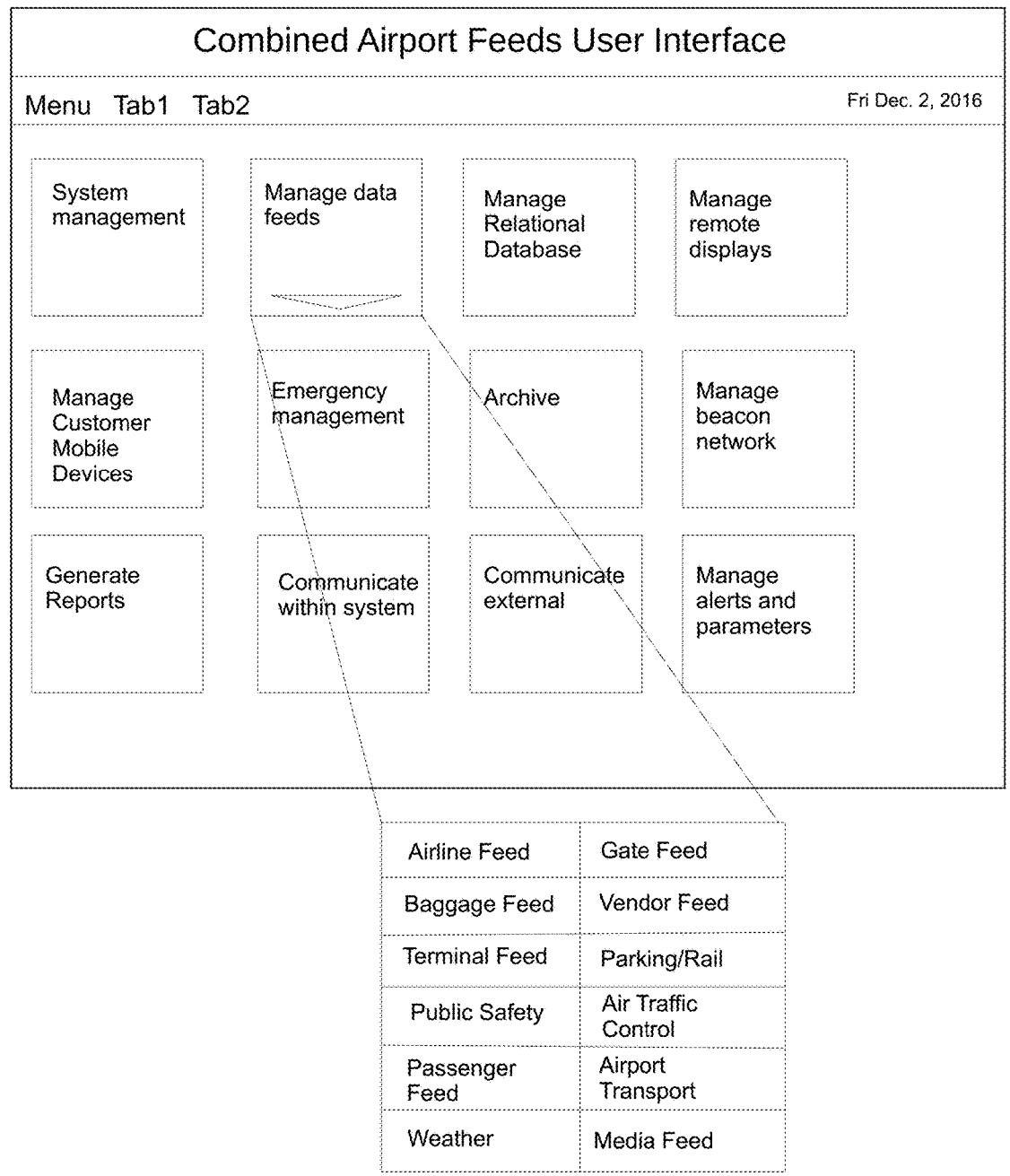
FIG. 15 shows a non-limiting example of an embodiment of a combined airport feeds user interface (CAFUI) according to the present invention.

FIG. 15 shows a non-limiting example of an embodiment of a combined airport feeds user interface (CAFUI) according to the present invention. The CAFUI can be composed of regions within a single screen, or can be composed of a general table of contents screen with access, e.g. tabs, radio buttons, etc., within menus or otherwise, to secondary screens presenting detailed information in a hierarchical manner. The CAFUI is illustrated as separated into regions. Although regions can be generated using any desired data feed or combination thereof, FIG. 15 shows regions relating to airline, check-in, baggage, terminal-specific, public safety, passenger screening, weather, outside media sources, gate information, vendors, transportation, air traffic control, and conveyances.

It is understood that the above-described embodiments are illustrative of only a few of the many possible specific embodiments, which can represent applications of the invention. Numerous and varied other arrangements can be made by those skilled in the art without departing from the spirit and scope of the invention.

The invention claimed is:

1. A method of providing media content to a plurality of displays in an airport, comprising:
providing a central control node that includes a computer with a processor linked to computer memory, wherein the central control node is configured with computer programming instructions to monitor and control a centralized data collection node and a data decoupling module, receiving real-time data feeds from multiple airport systems into the centralized data collection node, wherein the real-time data feeds comprise real-time airport data feeds selected from the group consisting of an airline data feed, a baggage data feed, a terminal data feed, a public safety data feed, a passenger data feed, a weather data feed, a gate data feed, a vendor data feed, a ground transportation data feed, an air traffic control data feed, and a media data feed mapping received real-time data feeds using computer program instructions in the data decoupling module, extracting mapped data using computer program instructions in the data decoupling module, coding the extracted mapped data using computer program instructions in the data decoupling module, validating the coded extracted mapped output data using computer program instructions in the data decoupling module, and storing the mapped-extracted-coded-validated (MECV) output data in a relational database using computer program instructions in the data decoupling module, wherein the central control node is configured with computer programming instructions to manage the relational database, transmitting selected and filtered (SnF) output data from the relational database to a plurality of remote display devices, wherein the central control node is configured with computer programming instructions to transmit the SnF output data to the plurality of display devices, monitoring and controlling the real-time data feeds, relational database management, data decoupling and output selection, device detection feedback, output data feed distribution to a display device, and the updating of output data feeds for repurposing the plurality of displays in an airport, wherein the central control node is configured with computer programming instructions to monitor and control real-time data feeds, relational database management, data decoupling and output selection, device detection feedback, output data feed distribution to a display device, and the updating of output data feeds for repurposing the plurality of displays in an airport, and, providing a combined airport data feeds user interface to a display connected to the centralized data collection node, said interface comprising:

a data feeds region configured with computer programming instructions to display links to real-time airport data feeds selected from the group consisting of an airline data feed, a baggage data feed, a terminal data feed, a public safety data feed, a passenger data feed, a weather data feed, a gate data feed, a vendor data feed, a transportation data feed, an air traffic control data feed, and a media data feed;

a system management region configured with computer programming instructions to display system management tools for centralized management and distribution of airport content media, at least one additional region configured with computer programming instructions to display information relating to the at least one additional region, wherein the at least one additional region selected from a manage relational database region, a manage remote display region, a manage customer/passenger mobile devices region, an emergency management region, an archive region, a manage beacon network region, a generate reports region, a communication region, an alert region, and an system parameters region.

2. The method of claim 1, wherein transmitting selected and filtered output data from the relational database includes the steps of detecting a type of display of the plurality of displays, wherein the type of display comprises one or more devices selected from the group consisting of a smartphone, a tablet, a laptop, and a desktop computer, and using an application programming interface (API) specific for each type of device to receive device-modified special purpose output data.

3. The method of claim 1, wherein the airline data feed is received according to the following steps:
providing a web server connected to the Internet, wherein the web server is programmed to access the centralized data collection node, wherein the web server has a data storage device, a connection to the Internet to communicate with the airline, and a messaging gateway coupled to a network to communicate with the centralized data collection node;
providing at least one remote access module that is connected to the centralized data collection node, the remote access module having a digital interface coupled to the centralized data collection node and a communications module to communicate with the web server via the network, and the messaging gateway; and
providing an internet device is connected to the internet to allow the airline to communicate with the web server, wherein the airline can remotely access and control the centralized data collection node via the web server.

4. The method of claim 1,
wherein the airline feed data is directly received from an airline and includes arrival and departure data directly from the airline and formatted as received from the airline,
wherein the check-in feed data is directly received from an airline check-in desk and includes gate information from the airline or a proxy,
wherein the baggage feed data is directly received from an airport baggage system and includes baggage location and belt information from the airport baggage system or a proxy, airport-generated baggage data, airline information, and law enforcement information relating to TSA lists, DEA (drugs), FDA (foodstuffs, pharmaceuticals, etc.), Treasury (currency), ATF (firearms), and parallel State law enforcement data,
wherein terminal-specific feed data is directly received from an airport terminal system and includes concessions and amenities information from the airport terminal system or a proxy,
wherein public safety feed data is directly received from an airport public safety system and includes real-time emergency notification information from the airport public safety system, first responder system, or a proxy,
wherein passenger screening feed data is directly received from an airport passenger screening system and includes wait time information from the airport passenger screening system or a proxy, external passenger screening data such as TSA no-fly list data, federal or State judicial information for wanted persons or fugitives, federal or State law-enforcement data relating to child-safety alerts, immigration data, customs data, and taxation data,
wherein weather feed data is directly received from an airport weather system and includes current destination weather information from the airport weather system or a proxy,
wherein television feed data is directly received from the airport television control system and includes broadcast channels and information from the airport television control system or a proxy,
wherein gate information feed data 1 is directly received from an airport gate information system and includes gate location information from the airport gate information system or a proxy, airline/airport gate assignments, gate changes, gate maintenance, jetway data, air travel delay data, passenger secondary verification and screening data, excess baggage data, carry-on baggage data, disabled passenger data (wheelchair, chaperone, carting), and special need passenger data (unaccompanied minor),
wherein vendor feed data is directly received from an airport vendor system and includes passenger services and advertising information from the airport vendor system or a proxy,
wherein transportation feed data is directly received from the airport transportation system and includes parking, bus, taxi, and subway/rail information from the airport transportation system or a proxy,
wherein air traffic control feed data is directly received from the airport air traffic control system and includes airport status information from the air traffic control system or a proxy, airborne air traffic data, ground/runway data, ground crew and ground equipment data, jetway data, aircraft re-fueling data, aircraft re-supply data, weather data, and entire air travel system data, and
wherein conveyance monitoring feed is directly received from an airport passenger conveyance system and includes elevator, escalator, jetway, and walkway information from the airport conveyance system or a proxy.

* * * * *